US012628040B2

(12) United States Patent
Peng et al.

(10) Patent No.: US 12,628,040 B2
(45) Date of Patent: May 12, 2026

(54) WI-FI DEVICE AND ASSOCIATED TRANSMISSION CONTROL METHOD

(71) Applicant: MEDIATEK Inc., Hsinchu City (TW)

(72) Inventors: Yang-Hung Peng, Hsinchu City (TW); Cheng-Yi Chang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 401 days.

(21) Appl. No.: 18/484,530

(22) Filed: Oct. 11, 2023

(65) Prior Publication Data

US 2024/0049052 A1 Feb. 8, 2024

Related U.S. Application Data

(63) Continuation-in-part of application No. 17/964,045, filed on Oct. 12, 2022, now Pat. No. 12,356,447.

(60) Provisional application No. 63/383,114, filed on Nov. 10, 2022, provisional application No. 63/255,452, filed on Oct. 14, 2021.

(51) Int. Cl.
*H04W 28/06* (2009.01)
*H04W 72/0446* (2023.01)

(52) U.S. Cl.
CPC ....... *H04W 28/06* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2021/0014911 A1 | 1/2021 | Patil | |
| 2021/0144698 A1 | 5/2021 | Kwon et al. | |
| 2021/0385692 A1* | 12/2021 | Kwon | H04W 28/24 |
| 2022/0141785 A1 | 5/2022 | Gan | |
| 2022/0330344 A1 | 10/2022 | Lou | |

(Continued)

FOREIGN PATENT DOCUMENTS

WO 2021008502 A1 1/2021

OTHER PUBLICATIONS

EP Search Report dated Mar. 21, 2024 in EP application No. 23206835.3-1215.

(Continued)

*Primary Examiner* — Anh Vu H Ly
(74) *Attorney, Agent, or Firm* — McClure, Qualey & Rodack, LLP

(57) ABSTRACT

A Wi-Fi (Wi-Fi) device and a transmission control method are provided. The Wi-Fi device selectively transmits at least a data division of a transmission data on a low performance link based on several parameters. The parameters include a start time point of a backoff procedure of the low performance link, a duration information associated with another Wi-Fi device on a high performance link, and some predefined exception conditions. By overhearing status of another Wi-Fi device on the high performance link, the Wi-Fi device attempts to acquire the duration information. If the duration information can be acquired, the Wi-Fi device calculates a coherent remnant-duration accordingly. Then, the Wi-Fi device determines whether the transmission data should be transmitted immediately on the low performance link, transmitted later on the high performance link, or partially transmitted on the low performance link.

18 Claims, 18 Drawing Sheets

(56) References Cited

U.S. PATENT DOCUMENTS

| | | | | |
|---|---|---|---|---|
| 2023/0309151 A1* | 9/2023 | Kim | .................... | H04W 28/082 |
| 2023/0379999 A1* | 11/2023 | Kim | .................... | H04B 7/0413 |
| 2024/0422613 A1* | 12/2024 | Kim | .................... | H04W 74/08 |

OTHER PUBLICATIONS

Akhmetov, et al.: "Discussion on methods for synchronous ML operations"; Jul. 2020; IEEE 802.11-20/993r0.
TW Office Action dated Sep. 22, 2023 in Taiwan application No. 111138721.
Sharan Naribole et al., MLD Spatial Multiplexing Considerations, IEEE 802.11-20/0977r2, Jul. 2020, pp. 1-18, IEEE, Jul. 15, 2020, XP068172949.
35. Extremely high throughput (EHT) MAC specification, IEEE P802.11 be/D0.2, Dec. 2020, pp. 1-25, IEEE, XP068183800, Dec. 2020.
Dmitry Akhmetov et al., Discussion on methods for synchronous ML operations, IEEE 802.11-20/993r0, Jul. 2020, pp. 1-23, IEEE, Jul. 3, 2020, XP068172888.
EP Search Report dated Feb. 14, 2023 in EP application No. 22201276.7-1215.

* cited by examiner

WI-FI DEVICE AND ASSOCIATED TRANSMISSION CONTROL METHOD

This is a continuation-in-part of U.S. application Ser. No. 17/964,045, filed Oct. 12, 2022. This continuation-in-part application claims the benefit of U.S. provisional application Ser. No. 63/383,114, filed Nov. 10, 2022, the subject matter of which is incorporated herein by reference.

TECHNICAL FIELD

The disclosure relates in general to a Wi-Fi device and an associated transmission control method, and more particularly to a Wi-Fi device and an associated transmission control method capable of enhancing throughput with a multi-link coherent operation.

BACKGROUND

In a Wi-Fi multi-link operation (MLO), there may exist several links between two MLDs, including one access point (AP) and one non-AP station (STA), that occupy different radio-frequency (RF) bands. These links can operate independently to increase the overall throughput and/or to improve the connection stability. However, each link has its own capacity that is based on several parameters, including bandwidth (BW), number of spatial streams (NSS), modulation and coding mechanism (MCS), etc. In addition, each link has its own condition that is based on several parameters, including loading, interference, etc. Capacities and conditions of links can be very different. Hence, it is desirable to optimally utilize these asymmetric links to maximize the overall system performance.

SUMMARY

The disclosure is directed to a Wi-Fi device and an associated transmission control method capable of enhancing throughput with a multi-link coherent operation.

According to one embodiment, a Wi-Fi device is provided. The Wi-Fi device and another Wi-Fi device are in an overlapping basic service set (BSS). The another Wi-Fi device transmits a first physical layer protocol data unit (PPDU) frame on a first link between a first-first time point and a third-first time point. The Wi-Fi device includes a MAC module, and the media access control address (MAC) module includes a receiving circuit, a first transmission circuit corresponding to the first link, a second transmission circuit, and a link selection module. The receiving circuit acquires duration information associated with a first payload portion of the first PPDU frame at a second-first time point, wherein the second-first time point is between the first-first time point and the third-first time point. The second transmission circuit selectively transmits a second PPDU frame on a second link between a first-second time point and a second-second time point, wherein the performance of the second link is lower than the performance of the first link. The link selection module is electrically connected to the receiving circuit, the first transmission circuit, and the second transmission circuit. The link selection module selectively controls the first transmission circuit and the second transmission circuit to perform transmission according to the statuses of the first link and the second link.

According to another embodiment, a transmission control method employed by the Wi-Fi device is provided. The Wi-Fi device and another Wi-Fi device are in an overlapping basic service set (BSS), and the another Wi-Fi device transmits a first PPDU frame on a first link between a first-first time point and a third-first time point. The transmission control method includes the following steps. Firstly, duration information associated with a first payload portion of the first PPDU frame is acquired at a second-first time point. The second-first time point is between the first-first time point and the third-first time point. Then, a second PPDU frame is selectively transmitted on a second link between a first-second time point and a second-second time point. The performance of the second link is lower than the performance of the first link.

These and other objectives of the present invention will no doubt become obvious to those of ordinary skill in the art after reading the following detailed description of the preferred embodiment that is illustrated in the various figures and drawings.

Figure 1:
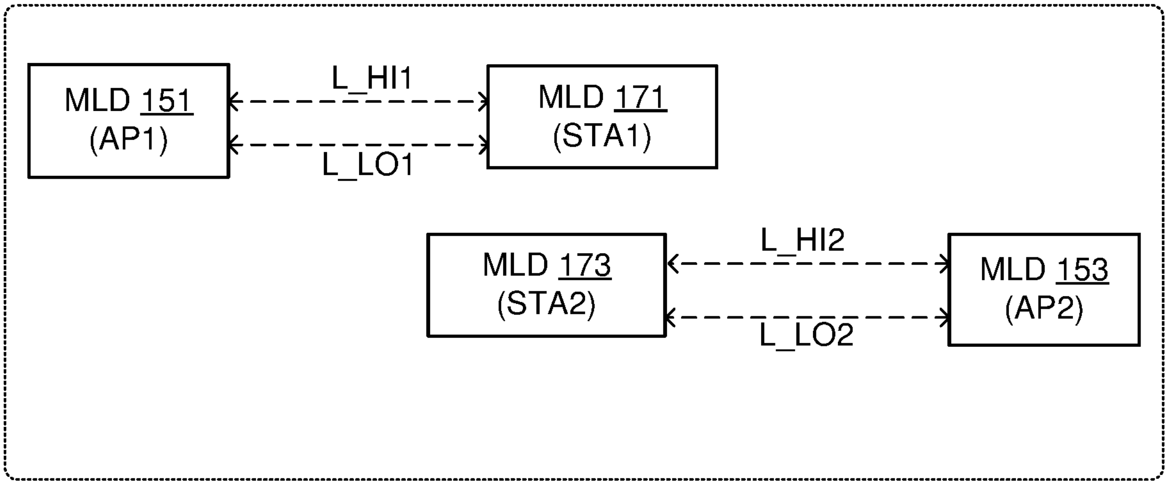
FIG. 1 is a schematic diagram illustrating an occasion when multiple access points and multiple stations coincidently select the same links for the frame exchange process.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection or through an indirect electrical connection via other devices and connections.

The frame exchange process between a station device (STA) and an access point (STA) in an environment having asymmetric multi-links is concerned. To enhance transmission efficiency, EMLSR is an approach proposed in 802.11 specifications. However, the conventional EMLSR proposed in 802.11 specifications is not suitable for environments having unbalanced links, so an EMLXR-based txOnRx alignment was proposed in the US patent application (application Ser. No. 17/964,045). In short, the EMLXR-based txOnRx alignment intends to acquire the duration information reported by the header portion and simultaneously make use of the low performance link L_LO before the PPDU frame exchange process of other Wi-Fi devices access L_HI completes. Nevertheless, the EMLXR-based txOnRx alignment has limitations for low to medium overlapping basic service sets (OBSS) load, and further improvement is required. In the specification, EMLXR may present enhanced multi-link single-radio (EMLSR) and/or enhanced multi-link multi-radio (EMLMR).

For better comprehension of the technical features of the proposed multi-link coherent operation, the following embodiments assume that the asymmetric multi-links include a high performance link L_HI with higher throughput and a low performance link L_LO with lower throughput. The two links do not interfere with each other. The core concept of the multi-link coherent transmission is that the STA transmits data to its corresponding AP on the low performance link L_LO only while the high performance link L_HI is utilized by another pair of AP and STA.

The performance of a link is comprehensively determined by different link capabilities (for example, bandwidth (BW), modulation coding scheme (MCS), and/or number of spatial streams (NSS)) and conditions (for example, loading and/or interference). The high performance link L_HI and the low performance link L_LO might represent two channels at the same band (one of the 2.4 GHz, 5 GHz, and 6 GHz bands) or at different bands (two of the 2.4 GHz, 5 GHz, and 6 GHz bands).

FIG. 1 is a schematic diagram illustrating an occasion when multiple access points and multiple stations coincidently select the same links for the frame exchange process. In FIG. 1, the frame exchange process between Wi-Fi (Wi-Fi) multi-link devices (MLD) 151, 171, and the frame exchange process between MLDs 153 and 173 are performed. For illustration purposes, the MLD 151 is considered as an access point (AP1), the MLD 153 is considered as an access point (AP2), the MLD 171 is considered as a station device (STA1), and the MLD 173 is considered as a station device (STA2).

The MLD (AP1) 151 and the MLD (STA1) perform a frame exchange process on the high performance link L_HI1 and the low performance link L_LO1. The MLD (AP2) 153 and the MLD (STA2) 173 perform a frame exchange process on the high performance link L_HI2 and the low performance link L_LO2. As channel (link) contentions are concerned in the specification, it is assumed L_HI1=L_HI2=L_HI and L_LO1=L_LO2=L_LO.

As the OBSS distribution in the environment changes from time to time, a flexible transmission control method applied to an MLD (for example, STA2) is provided. According to the embodiments of the present disclosure, the Wi-Fi MLD concerns several parameters, including the link status and attributes of its transmission data. Various transmission configurations are provided to make the Wi-Fi MLD adaptively select the appropriate and efficient configuration for data transmission.

According to the embodiments of the present disclosure, the Wi-Fi MLD may transmit the packets on one of the high performance link L_HI and the low performance link L_LO, suspend packet transmission, or transmit part of the packets on the low performance link L_LO and leave the other part of the packets for transmission later. Different embodiments are illustrated below to demonstrate how the transmission control method selects the suitable transmission configuration.

Figure 2:
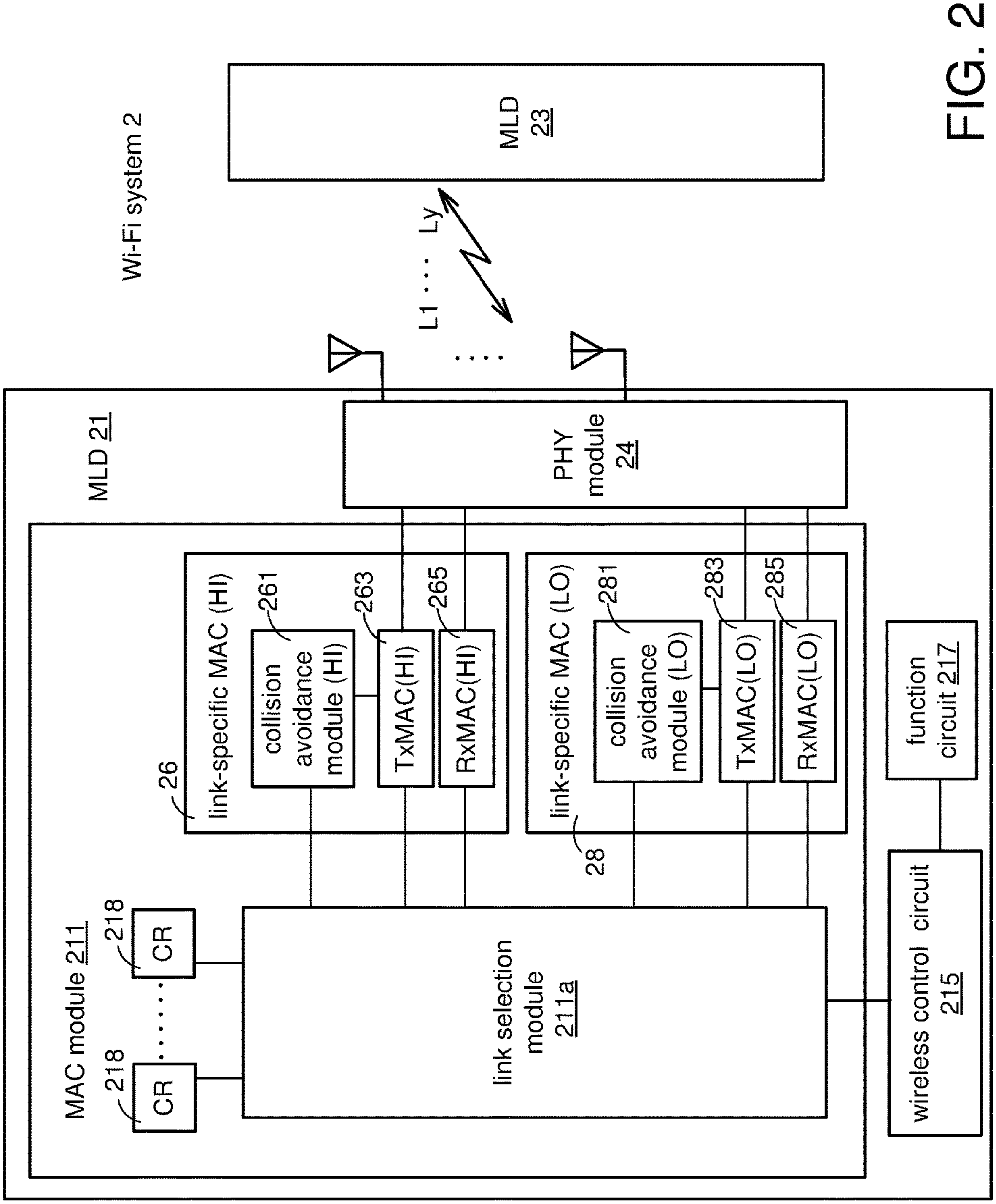
FIG. 2 is a schematic diagram illustrating a Wi-Fi system according to an embodiment of the present disclosure.

FIG. 2 is a schematic diagram illustrating a Wi-Fi (Wi-Fi) system according to an embodiment of the present disclosure. For brevity and simplicity, it is assumed that the Wi-Fi system 2 includes MLDs 21 and 23. The MLD 21 is a station device (STA), and the MLD 23 is an access point (AP).

The MLD 21 includes a function circuit 217, a wireless control circuit, a media access control address (MAC) module 211, a physical layer (PHY) module 24, and multiple antennas. The wireless control circuit 215 is electrically connected to the MAC module 211 and the function circuit 217. The wireless control circuit 215 executes Wi-Fi-related programs at the upper layer. Moreover, the wireless control circuit 215 communicates and cooperates with the function circuit 217. The PHY module 24 is electrically connected to the MAC module 211 and the antennas.

The MAC module 211 includes control registers (CR) 218, a link selection module 211*a*, and plural link-specific MACs. Depending on the number of coherent links utilized by the MLD 21, the control registers (CR) are configured, and the number of link-specific MACs may vary. For the sake of illustrations, the following embodiments are demonstrated on a two-link basis. Therefore, a link-specific MAC (HI) 26 corresponding to the high performance link L_HI and a link-specific MAC (LO) 28 corresponding to the low performance link L_LO are shown in FIG. 2.

The link-specific MAC (HI) 26 includes a collision avoidance module (HI) 261, a TxMAC(HI) 263, and a RxMAC (HI) 265, and all are electrically connected to the link selection module 211*a*. The collision avoidance module (HI) 261 is electrically connected to the TxMAC(HI) 263. The TxMAC(HI) 263 and the RxMAC(HI) 265 are electrically connected to the PHY module 24.

The link-specific MAC (HI) 28 includes a collision avoidance module (LO) 281, a TxMAC(LO) 283, and a RxMAC (LO) 285, and all are electrically connected to the link selection module 211*a*. The collision avoidance module (LO) 281 is electrically connected to the TxMAC(LO) 283. The TxMAC(LO) 283 and the RxMAC(LO) 285 are electrically connected to the PHY module 24.

It is assumed in the embodiments that the collision avoidance module (HI) 261 includes a backoff counter corresponding to the high performance link L_HI (that is, backoff counter CNT_HI) and the collision avoidance module (LO) 281 includes a backoff counter corresponding to the low performance link L_LO (that is, backoff counter CNT_LO). The counting values of the backoff counters CNT_HI and CNT_LO are referred to by the link selection module 211*a* to determine how the TxMAC(HI) 263 and TxMAC(LO) 283 are controlled.

The MLD 21 utilizes carrier-sense mechanisms to determine if any channel activity exists/occurs at its corresponding links. If there is no medium activity in its corresponding links, the backoff counter corresponding to the link (CNT_HI or CNT_LO) is decreased by the unit of time slot. On the other hand, if any of the medium activity exists/occurs in one of the other links, the backoff counter (CNT_HI or CNT_LO) holds its counting value. The counting value held by the backoff counter (CNT_HI or CNT_LO) (that is, the residual backoff counting value) will be decreased later once there is no medium activity in the links corresponding to the MLD 21. The link corresponding to the backoff counter (CNT_HI or CNT_LO) being counted to zero will start transmitting data. In short, the backoff counter CNT_HI is utilized to determine whether the high performance link L_HI can be accessed by the MLD 21, and the backoff counter CNT_LO is utilized to determine whether the low performance link L_HI can be accessed by the MLD 21.

In some embodiments, the MLD 21, 23 may own x links L1-Lx and may communicate with each other via y links L1-Ly. The variables x and y are positive integers, wherein y is not smaller than 2, and x is greater than or equivalent to y. In this embodiment, each of the links L1-Ly may be defined by a channel of a band. For example, the links L1-Ly may include different channels of the same band (for example, 2.4 GHz, 5 GHz, or 6 GHz band) and/or channels of different bands (for example, 2.4 GHz, 5 GHz, and/or 6 GHz band).

Figure 3:
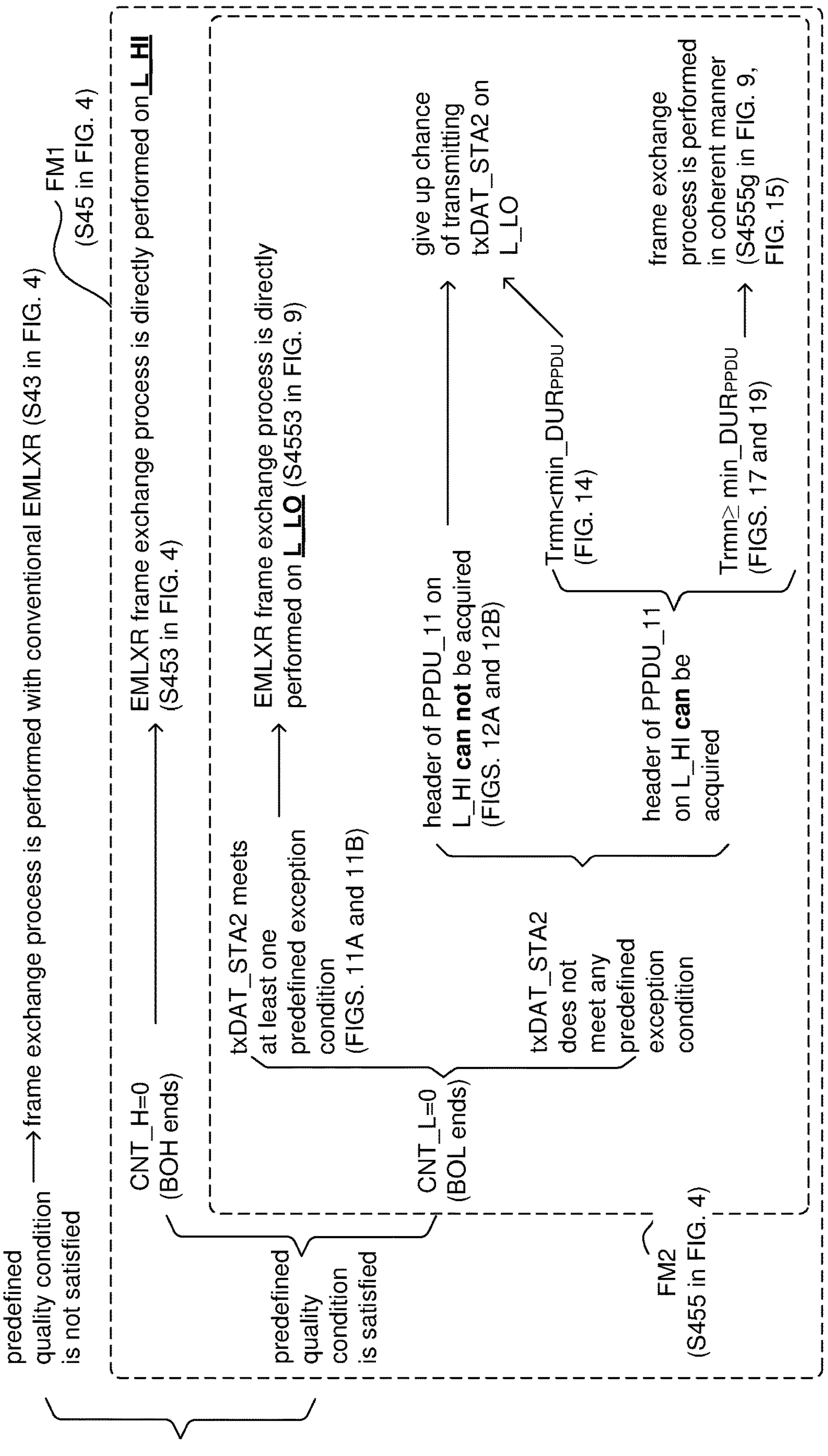
FIG. 3 is a schematic diagram illustrating the classification of transmission configurations according to the embodiment of the present disclosure.

FIG. 3 is a schematic diagram illustrating the classification of data transmission modes being selected by the link selection module according to the embodiment of the present disclosure. For the sake of illustration, the frame exchange processes described below are mainly based on a viewpoint of STA2. The following mentioned operations and components belong to STA2 unless otherwise specified.

In FIG. 3, different types of OBSS distribution and combinations of the unbalanced links are concerned. As a station device, STA2 dynamically adjusts its transmission configuration to effectively respond to the asymmetric link's real-time status. Details about the classification in FIG. 3 are illustrated together with other figures, as noted in the brackets.

Figure 4:
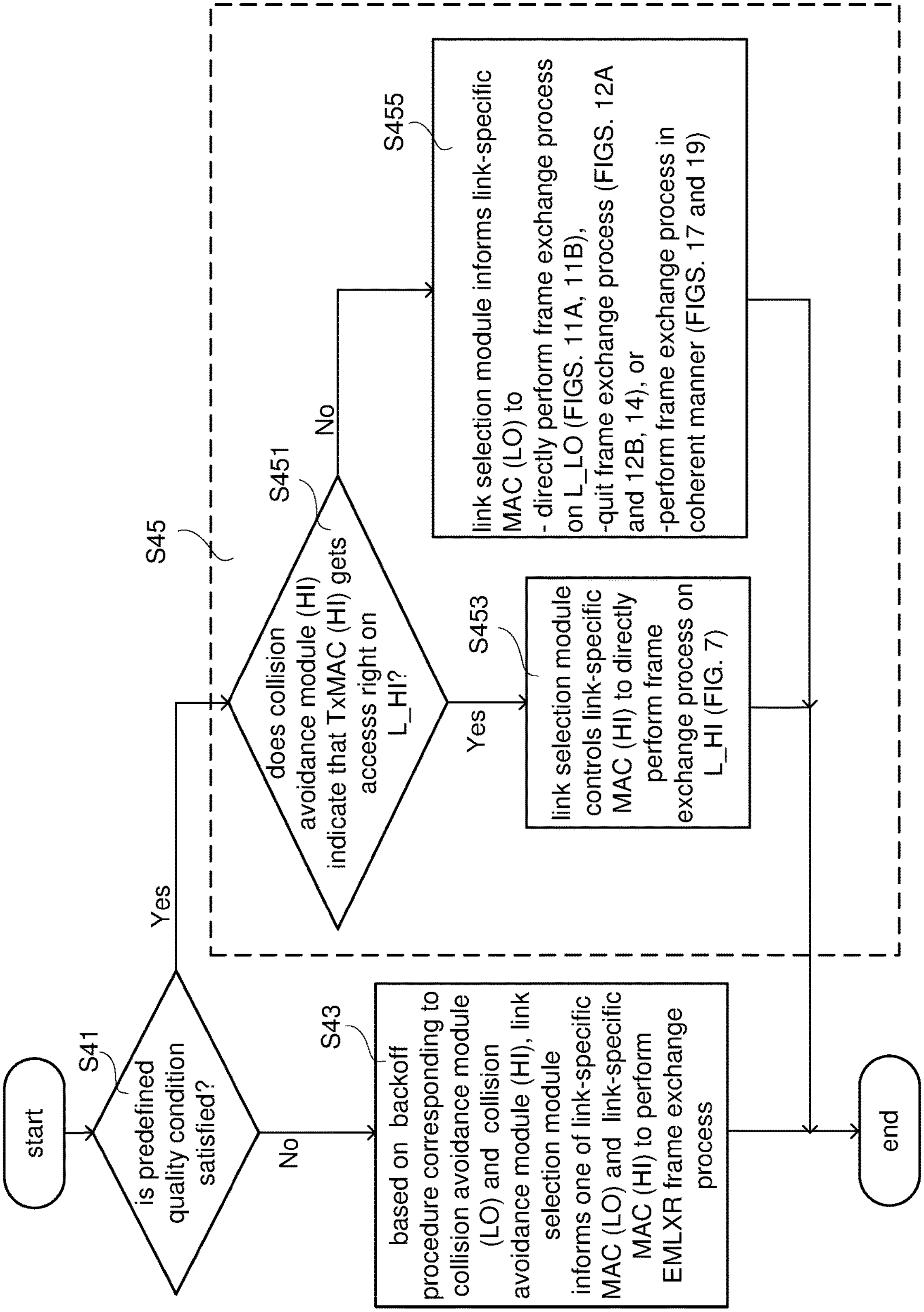
FIG. 4 is a flow diagram illustrating the transmission control method capable of adaptively selecting the transmission mode in response to the satisfaction of the predefined quality condition according to the embodiment of the present disclosure.

FIG. 4 is a flow diagram illustrating the transmission control method capable of adaptively selecting the transmission mode in response to the satisfaction of the predefined quality condition according to the embodiment of the present disclosure. Please refer to FIGS. 2, 3, and 4 together. Firstly, the link selection module 211*a* checks if a predefined quality condition is satisfied (step S41). Please note that the predefined quality condition is not limited but freely defined in practical applications.

An exemplary predefined quality condition is related to the OBSS load. For example, the predefined quality condition is considered satisfied if the OBSS load in the environment is lower than or equivalent to a predefined OBSS threshold, and vice versa. The predefined OBSS threshold can be, for example, between 40%~50%.

If the determination result of step S41 is negative, the link selection module 211*a* controls one of the TxMAC(HI) 263 and TxMAC(LO) 283 to perform the frame exchange process with the conventional EMLXR, depending on which of the backoff procedures corresponding to collision avoidance module (LO) and collision avoidance module (HI) ends first (step S43). In step S43, the link selection module 211*a* informs the link-specific MAC (LO) 28 to perform the EMLXR frame exchange process on the low performance link L_LO if the backoff procedure of the low performance link BOL ends prior to the backoff procedure of the high performance link BOH ends and vice versa.

If the determination result of step S41 is positive, the link selection module 211*a* dynamically changes its transmission configuration based on comprehensive consideration (step S45). The factors affecting the decision made by the link selection module 211*a* include the overhearing result, the backoff procedures of the low performance link BOL and the high performance link BOH, and inherent features of the transmission data txDAT_STA2. The dotted frame FM1 in FIG. 3 covers the classifications of the transmission configurations related to step S45.

Step S45 further includes the following steps. The link selection module 211*a* checks the backoff counter CNT_HI in the collision avoidance module (HI) 261 to clarify if the link-specific MAC (HI) 26 can get access right on high performance link L_HI (step S451). If the counting value of the backoff counter CNT_HI reaches "0", the determination result of step S451 is positive, and the link selection module 211*a* controls the link-specific MAC (HI) 26 to perform the frame exchange process on the high performance link L_HI (situation shown in FIG. 5) (step S453). In step S453, the duration length of the frame exchange process performed by the link-specific MAC (HI) 26 is directly dominated by the data length of the transmission data txDAT_STA2.

If the determination result of step S451 is negative, the link selection module 211*a* knows that the link-specific MAC (HI) 26 cannot perform the frame exchange process yet. Despite this, the link selection module 211*a* does not control the link-specific MAC (LO) 28 to perform the frame exchange process immediately. Instead, the link selection module 211*a* needs to consider more factors (step S455). In step S455, the link selection module 211*a* may control the link-specific MAC (LO) 28 to perform the frame exchange process on the low performance link L_LO (situations shown in FIGS. 11A and 11B), controls the link-specific MAC (LO) 28 not to perform the frame exchange process (situations shown in FIGS. 12A~12B and 14), or controls the link-specific MAC (LO) 28 to perform the frame exchange process in a coherent manner (situations shown in FIGS. 17 and 19). The dotted frame FM2 in FIG. 3 covers the classifications of the transmission configurations related to step S455.

In the specification, the frame exchange processes representing different situations are illustrated. Each of the frame exchange processes includes multiple timing axes to represent the procedures of the frame exchange processes on the high performance link L_HI and the low performance link L_LO. The rectangles above the timing axes represent the frames sent from an STA to an AP (for example, STA1 to AP1, or STA2 to AP2), and the rectangles underneath the timing axes represent the frames sent from an AP to an STA (for example, AP1 to STA1, or AP2 to STA2).

In these frame exchange processes, the rectangles use different screen tones to represent their source devices and their destination devices. The horizontal screen tones represent the frame exchange process between the MLDs whose reactions and operations are described by the specification (for example, AP2 and STA2), and the dotted screen tones represent the frame exchange process between other MLDs (for example, AP1 and STA1) whose reactions are not described in the present specification.

Moreover, a relatively dense screen tone (above a timing axis) is used to represent the signal transmitted from an STA to its corresponding AP, and the relatively loose screen tones (below a timing axis) are used to represent the signal transmitted from an AP to its corresponding STA. For example, the horizontal screen tone representing the frame exchange process from STA2 to AP2 is relatively dense, and the horizontal screen tone representing the frame exchange process from AP2 to STA2 is relatively loose.

The backoff procedure of the low performance link BOL represents the procedure that the backoff counter CNT_LO counts from a random value down to 0. The backoff procedure of the high performance link BOH represents the procedure that the backoff counter CNT_HI counts from a random value down to 0. In the frame exchange processes, acknowledgment frames (ACK), distributed inter-frame spacings (DIFS), and short interframe spaces (SIFS) are shown. Generation and duration control related to the backoff procedures (BOH, BOL), the distributed inter-frame spacing (DIFS), the short interframe space (SIFS), and the acknowledgment frame (ACK) can be referred to 802.11 specifications.

In the frame exchange processes, data frames are labeled with a physical layer protocol data unit (PPDU), with numbers representing the origin and the destination of the PPDU frame. For example, the PPDU_11 frame represents the data frame to be transmitted by STA1 to AP1, and the PPDU_22 frame represents the data frame to be transmitted by STA2 to AP2.

Figure 5:
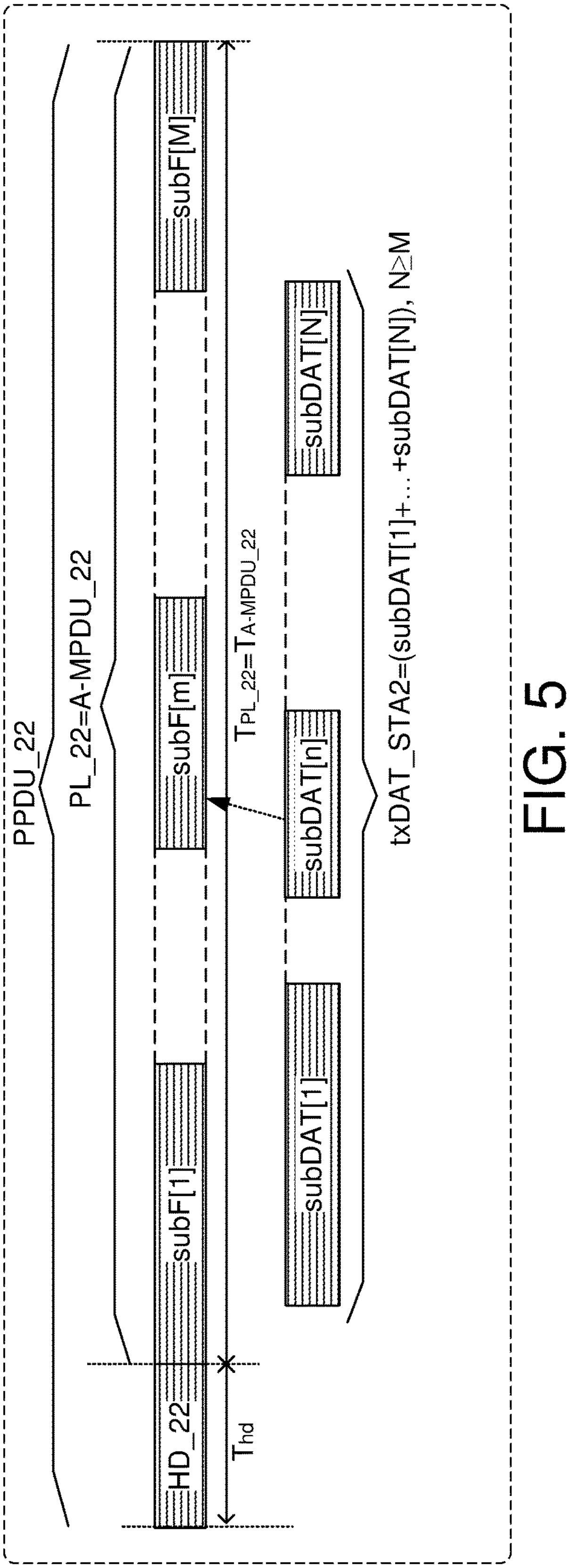
FIG. 5 is a schematic diagram illustrating an exemplary construction of the PPDU_22 frame.

FIG. 5 is a schematic diagram illustrating an exemplary construction of the PPDU_22 frame. In FIG. 5, the PPDU_22 frame includes a header portion HD_22 and a payload portion PL_22, and the duration of the PPDU_22 frame is equivalent to the duration of the header portion HD_22 ($T_{hd}$) and the duration of the payload portion PL_22 ($T_{PL\_22}$). In some applications, the PPDU_22 frame may further include one or more padding bits.

In the disclosure, the payload portion PL_22 of the PPDU_22 frame is assumed to be an aggregate-MAC protocol data unit (A-MPDU) in most cases. Thus, the payload portion PL_22 of the PPDU_22 frame can be represented as A-MPDU_22 (PL_22=A-MPDU_22), and the A-MPDU_22 includes M A-MPDU subframes subF[1]~subF[M]. In practical applications, the internal constructions of the header portion HD_22 and the payload portion PL_22 of the PPDU_22 frame may vary with different versions of 802.11 specifications. With adequate modifications, the concepts of the disclosure can be applied to other types of PPDU_22 frames having various constructions of the header portion HD_22 and the payload portion PL_22.

Each of the A-MPDU subframes subF[1]~subF[M] carries one of the N data subsets subDAT[n], wherein n=1~N, and 1≤M≤N. For example, the A-MPDU subframe subF[m] (m=1~M) carries the data subset subDAT[n].

As the format of the header portion HD_22 is specified in the 802.11 specification, the duration of the header portion HD_22 ($T_{hd}$) is known. On the other hand, the duration of the payload portion PL_22 changes with the number of A-MPDU subframes (that is, M). According to 802.11 specifications, the duration information durINFO$_{PL_22}$ (reporting $T_{PL\_22}=T_{A\text{-}MPDU\_22}$) associated with the payload portion PL_22 of the PPDU_22 frame is reported in the header portion HD_22 of the PPDU_22 frame.

Figure 6A:
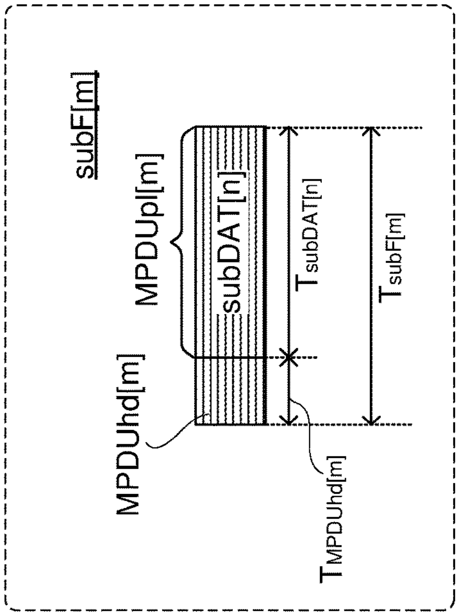
FIGS. 6A and 6B are schematic diagrams illustrating the exemplary construction of an A-MPDU subframe subF[m].
Figure 6B:
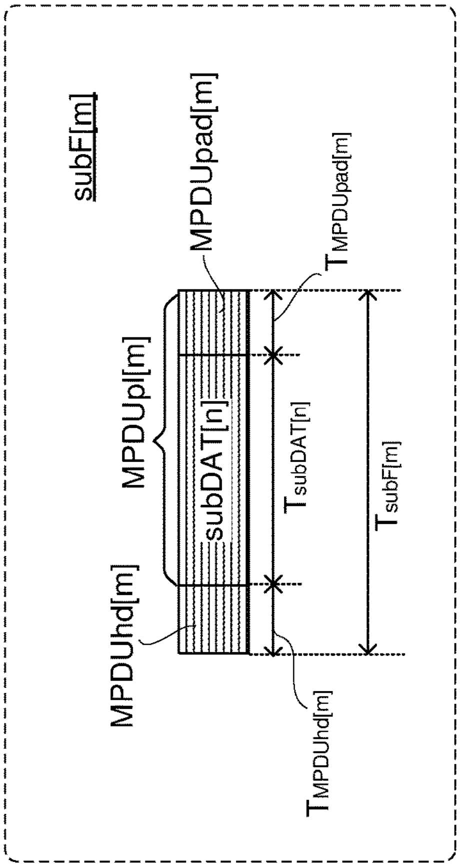

FIGS. 6A and 6B are schematic diagrams illustrating the exemplary construction of an A-MPDU subframe subF[m]. In FIGS. 6A and 6B, the A-MPDU subframe subF[m] includes an MPDU subframe header (MPDUhd[m]) and an MPDU subframe payload (MPDUpI[m]), wherein the MPDU subframe payload (MPDUpI[m]) carries an n-th data subset subDAT[n].

In FIG. 6A, the MPDU subframe payload MPDUpI[m] includes a data subset subDAT[n]. Thus, the duration of A-MPDU subframe subF[m](that is, $T_{subF[m]}$) in FIG. 6A is equivalent to the summation of the duration of the MPDU subframe header (MPDUhd[m]) ($T_{MPDUhd[m]}$) and the duration of data subset subDAT[n] ($T_{subDAT[n]}$). That is, $T_{subF[m]}=T_{MPDUhd[m]}+T_{subDAT[n]}$.

In FIG. 6B, the MPDU subframe payload MPDUpI[m] includes a data subset subDAT[n] and MPDU paddings MPDUpad[m]. Thus, the duration of A-MPDU subframe subF[m] ($T_{subF[m]}$) in FIG. 6B is equivalent to the summation of the duration of MPDU subframe header MPDUhd [m]($T_{MPDUhd[m]}$), the duration of data subset subDAT[n] ($T_{subDAT[n]}$), and the duration of MPDU paddings ($T_{MPDUpad[m]}$). That is, $T_{subF[m]}=T_{MPDUhd[m]}+T_{subDAT[n]}+T_{MPDUpad[m]}$.

According to FIGS. 6A and 6B, the MPDU paddings MPDUpad[m] are selectively appended. In practical applications, the MPDU paddings MPDUpad[m] are added at the end of the MPDU subframe payload MPDUpI[m] whenever necessary, and the exact format and length of the MPDU paddings MPDUpad[m] is not limited. Basically, the MPDU paddings MPDUpad[m] are utilized for dynamically adjusting the duration of the payload portion $T_{PL\_22}$.

Before an STA initiates the frame exchange process, it senses (listens) the medium status to determine if the link is free (if the medium is occupied by others). If the link is free, the STA (for example, STA2) starts the backoff procedure (BOH or BOL) to wait for a duration. Thus, an STA can listen to the header portions of the PPDU frames sent by other MLDs and be aware of the medium status in the environment. Based on the overhearing result, STA2 knows how to dynamically configure its data transmission.

To be more specific, by sharing the header portions of PPDU frames, the MLD is able to know whether a link is ongoing. Alternatively speaking, the MLD knows how long the link will be occupied by another MLD and manages its frame exchange process better. With the overhear mechanism, the opportunities for collisions can be reduced, and the throughput can be increased.

FIGS. 7, 11A, 11B, 12A, 12B, 14, 17, and 19 are examples showing how the link selection module 211*a* reacts and adjusts its transmission configuration according to different overhearing results.

Figure 7:
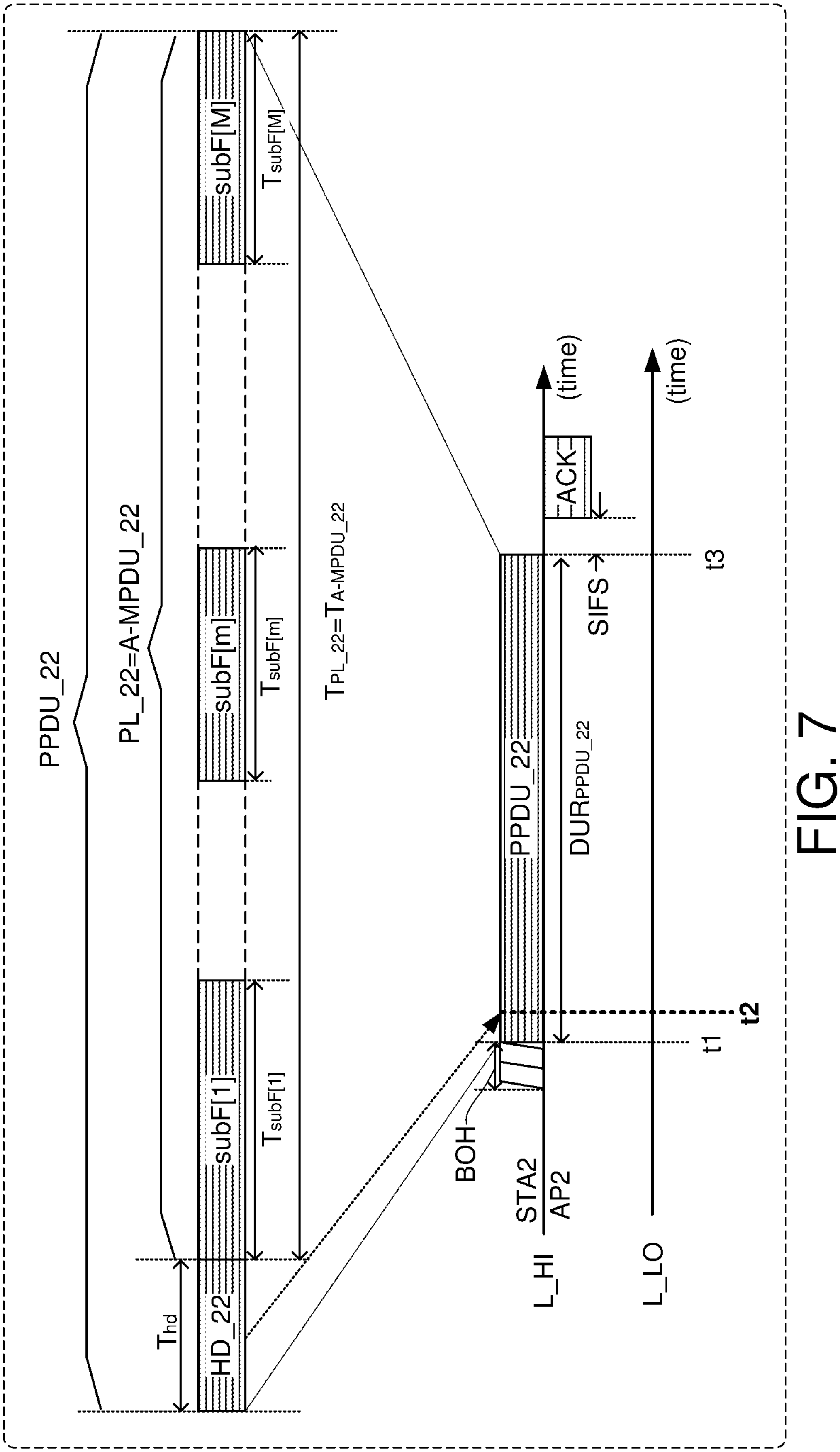
FIG. 7 is a schematic diagram illustrating that the Wi-Fi device STA2 gains access to the high performance link L_HI, and the Wi-Fi device STA2 performs the frame exchange process on the high performance link L_HI.

FIG. 7 is a schematic diagram illustrating that the Wi-Fi device STA2 performs the frame exchange process on the high performance link L_HI. Please refer to FIGS. 4 and 7 together. FIG. 7 corresponds to step S453 in FIG. 4. In this embodiment, the high performance link L_HI is not occupied by MLDs other than STA2 and AP2.

As shown in FIG. 7, the counting value of the backoff counter CNT_HI of STA2 reaches 0 at the time point t1. Therefore, STA2 gains access to the high performance link L_HI, and transmits the PPDU_22 frame on the high performance link L_HI between the time points t1 and t3, that is, $DUR_{PPDU\_22}$=(t3−t1). As summarized in FIG. 3, the link selection module 211*a* selects the high performance link L_HI for data transmission when the high performance link L_HI is not accessed by other MLDs (for example, AP1 and STA1). In FIG. 7, all the transmission data txDAT_STA2 are transmitted with a single PPDU_22 frame, and the data subsets subDAT[1]~subDAT[N] are respectively carried by A-MPDU subframes subF[1]~subF[M] in the payload PL_22, wherein M=N. Consequentially, the duration of the PPDU_22 frame ($DUR_{PPDU\_22}$) is equivalent to the summation of the duration of the header portion HD_22 ($T_{hd}$) and the durations of the A-MPDU subframes subF[1]~subF[M] ($T_{subF[1]}+\ldots T_{subF[M]}$). That is, $DUR_{PPDU\_22}=T_{hd}+T_{PL\_22}=T_{hd}+T_{A\text{-}MPDU\_22}=T_{hd}+(T_{subF[1]}+\ldots T_{subF[M]})$.

FIG. 7 represents an ideal occasion that the high performance link L_HI is free to access. Whereas the situation in FIG. 7 is unlikely to happen all the time, and STA2 needs to share or compete the usage of the high performance link L_HI and the low performance link L_LO with other Wi-Fi devices. Thus, an overhearing function has been provided in 802.11 specifications. In practical applications, the links' status changes constantly, and the overhearing result could dynamically reflect it. According to the embodiments of the present disclosure, different transmission configurations are provided to suit the various statuses of the links.

In general, the link selection module 211*a*, according to the embodiments of the present disclosure, prefers to perform the frame exchange process on the high performance link L_HI. However, as shown in the classification in FIG. 3, there are some occasions when the link selection module 211*a* needs to adjust its transmission configuration. The embodiments, according to the present disclosure, clarify how the transmission configuration should be adjusted in response to status changes of the unbalanced links.

Figure 8:
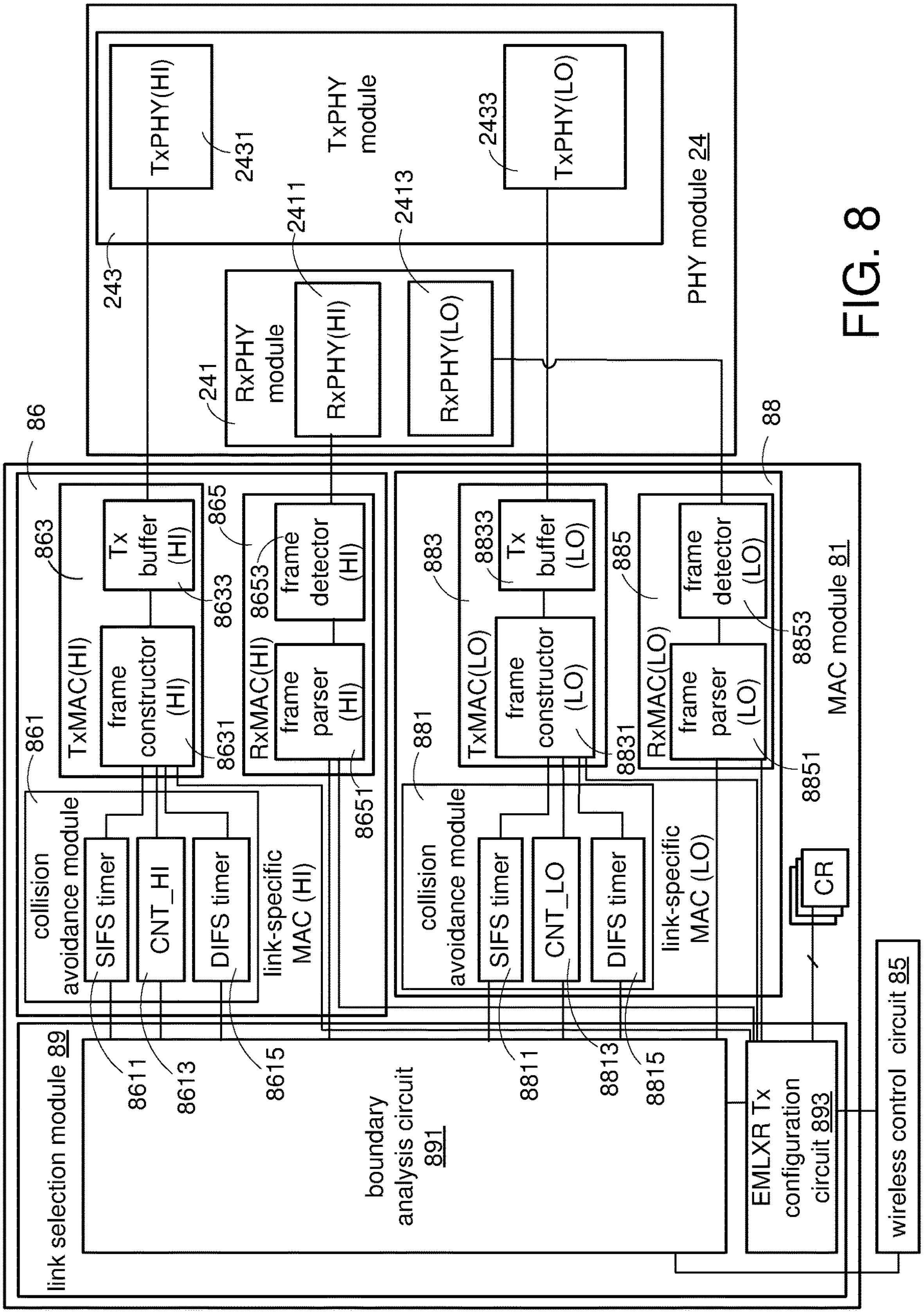
FIG. 8 is a block diagram illustrating a MAC module according to an embodiment of the present disclosure.

FIG. 8 is a block diagram illustrating a MAC module according to an embodiment of the present disclosure. The MAC module 81 is electrically connected to the wireless control circuit 85 and the PHY module 24.

The PHY module 24 includes a TxPHY module 243 and an RxPHY module 241. The RxPHY module 241 includes a receiving PHY corresponding to the high performance link L_HI (RxPHY(HI) 2411 and a receiving PHY corresponding to the low performance link L_LO (RxPHY(LO)) 2413. The TxPHY module 243 includes a transmission PHY corresponding to the high performance link L_HI (TxPHY (HI)) 2431 and a transmission PHY corresponding to the low performance link L_LO (TxPHY(LO)) 2433.

The MAC module 81 includes a link selection module 89, control registers (CR), a link-specific MAC (HI) 86 corresponding to the high performance link L_HI, and a link-specific MAC (LO) 88 corresponding to the low performance link L_LO. The control registers CR are electrically connected to the link selection module 89. The internal components and the interconnections of the link-specific MAC (HI) 86 are briefly described below.

The link-specific MAC (HI) 86 includes a collision avoidance module 861, a TxMAC(HI) 863, and an RxMAC(HI) 865. The internal components of the collision avoidance module 861, the TxMAC(HI) 863, and the RxMAC(HI) 865 are respectively described.

The collision avoidance module 861 further includes a SIFS timer 8611, a backoff counter 8613, and a DIFS timer 8615 corresponding to the high performance link L_HI. The SIFS timer 8611, the backoff counter (CNT_HI) 8613, and the DIFS timer 8615 are electrically connected to the TxMAC(HI) 863 and the link selection module 89.

The TxMAC(HI) 863 further includes a Tx buffer (HI) 8633 and a frame constructor (HI) 8631. The Tx buffer (HI) 8633 is electrically connected to the TxPHY(HI) 2431 and the frame constructor (HI) 8631. The frame constructor (HI) 8631 is electrically connected to the link selection module 89 and the collision avoidance module 86.

The SIFS timer 8611, the backoff counter (CNT_HI) 8613, and the DIFS timer 8615 transmit their statuses to the frame constructor 8631. The frame constructor 8631 organizes and constructs frames in the Tx packets based on the statuses of the SIFS timer 8611, the backoff counter (CNT_HI) 8613, and the DIFS timer 8615, the transmission data TxDAT received from the wireless control circuit 85 and the transmission configurations sent from the link selection module 89. After the frame constructor 8631 constructs the Tx packets, the Tx packets are temporarily stored at the Tx buffer (HI) 8633. Then, the Tx buffer (HI) 8633 transmits the Tx packets to the TxPHY(HI) 2431 at appropriate time points.

The RxMAC(HI) 865 further includes a frame detector (HI) 8653 and a frame parser (HI) 8651. The frame detector (HI) 8653 is electrically connected to the RxPHY(HI) 241 and the frame parser (HI) 8651. The frame parser (HI) 8651 is electrically connected to the link selection module 89. The frame detector (HI) 8653 receives Rx data from the RxPHY (HI) 2411 and passes Rx packets to the frame parser (HI) 8651. Then, the frame parser (HI) 8651 parses the fields in the Rx packets.

Similarly, the link-specific MAC (LO) 88 includes a collision avoidance module 881, a TxMAC(LO) 883, and a RxMAC(LO) 885. The TxMAC(LO) 883 is electrically connected to the TxPHY(LO) 2433, and the RxMAC(LO) 885 is electrically connected to the RxPHY(LO) 2413. As the internal components in the link-specific MAC (LO) 88 are similar to those in the link-specific MAC (HI) 86, detailed descriptions of the internal components in the link-specific MAC (LO) 88 and their interconnections are omitted.

The link selection module 89 further includes a boundary analysis circuit 891 and an EMLXR Tx configuration circuit 893. The boundary analysis circuit 891 is electrically connected to the link-specific MAC (HI) 86, the link-specific MAC (LO) 88, the EMLXR Tx configuration circuit 893, and the wireless control circuit 85. The Tx configuration circuit 893 is electrically connected to the wireless control circuit 85 and the frame constructor 853. The EMLXR Tx configuration circuit 893 informs the TxMAC(HI) 863 and TxMAC(LO) 883 whether they should both wait for the next transmission chance or one of them should perform the frame exchange process immediately.

Figure 9:
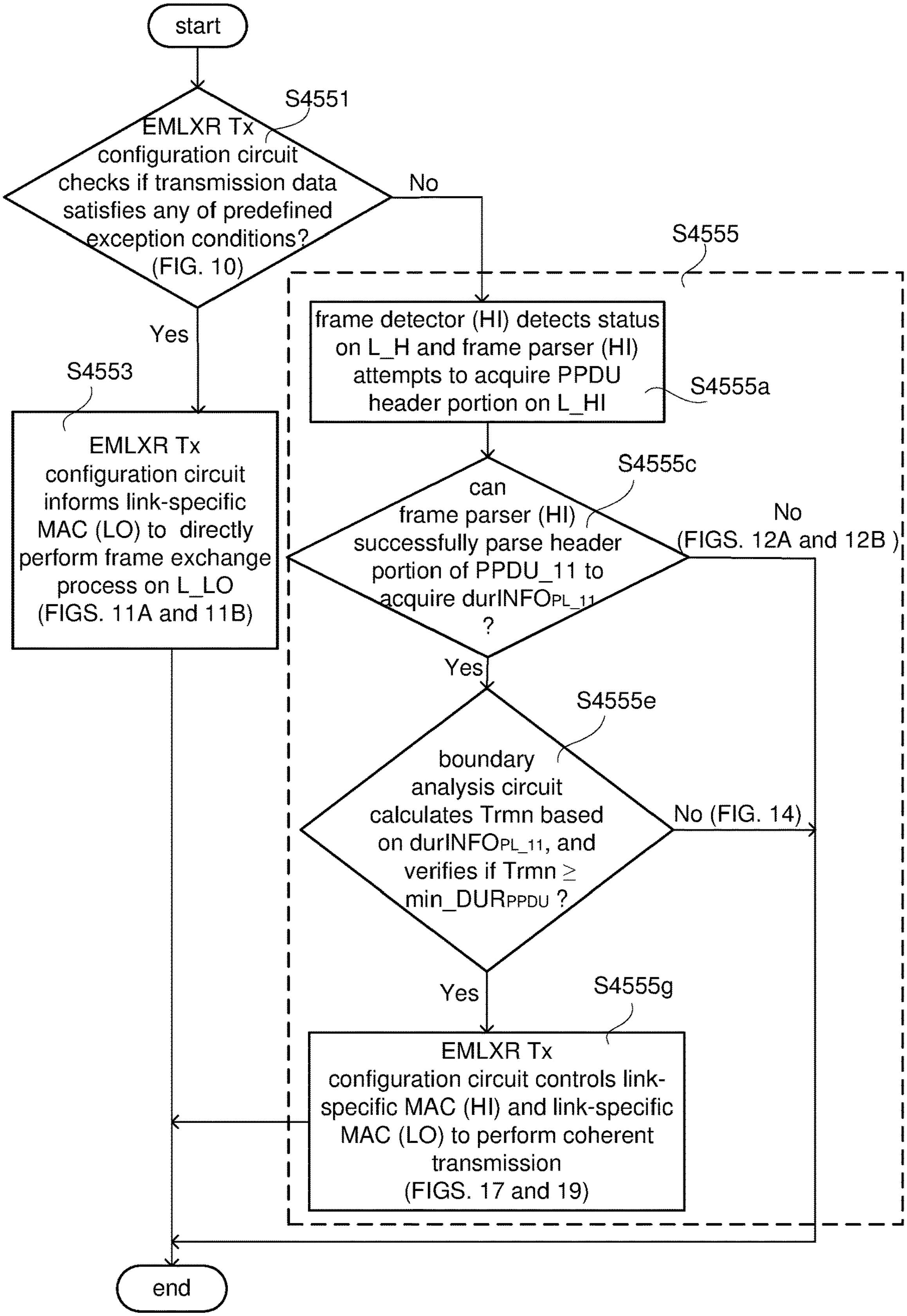
FIG. 9 is a flow diagram illustrating an exemplary implementation of step S455 in FIG. 4.

FIG. 9 is a flow diagram illustrating an exemplary implementation of step S455 in FIG. 4. The EMLXR Tx configuration circuit 893 checks if the transmission data (txDAT) satisfies any of the predefined exception conditions (step S4551). Step S4551 corresponds to the flow diagram in FIG. 10. If the determination result of step S4551 is positive, the EMLXR Tx configuration circuit 893 informs the link-specific MAC (LO) 88 to perform the frame exchange process on the low performance link L_LO (step S4553), as illustrated in FIGS. 11A and 11B.

In some applications, it is possible to skip steps S4451 and S4553. Or, in some applications, it is possible to execute step S4451 after step S4555*e* with some modifications. Details about such alternative designs are omitted. In practical applications, the order of the steps might be adjusted with appropriate modifications.

If the determination result of step S4551 is negative, the EMLXR Tx configuration circuit 893 controls the link-specific MAC (LO) 88 to temporarily ignore the transmission data txDAT_STA2 (see counterexamples in FIGS. 12A~12B and 14); transmit the complete transmission data txDAT_STA2 with the PPDU_22 frame (see FIG. 17); or transmit part of the transmission data txDAT_STA2 with the PPDU_22 frame (see FIG. 19) (step S4555). Step S4555 further includes the following steps.

Firstly, the frame detector (HI) 8653 overhears the high performance link L_HI and the frame parser (HI) 8651 attempts to acquire the fields in the header of the frames transmitted on the high performance link L_HI (step S4555*a*). Then, the frame parser (HI) 8651 parses the fields in the header portion of the PPDU_11 frame and successfully acquires the duration information durINFO$_{PL_11}$ associated with the payload portion PL_11 of the PPDU_11 frame being transmitted by STA1 (step S4555*c*).

Figure 12A:
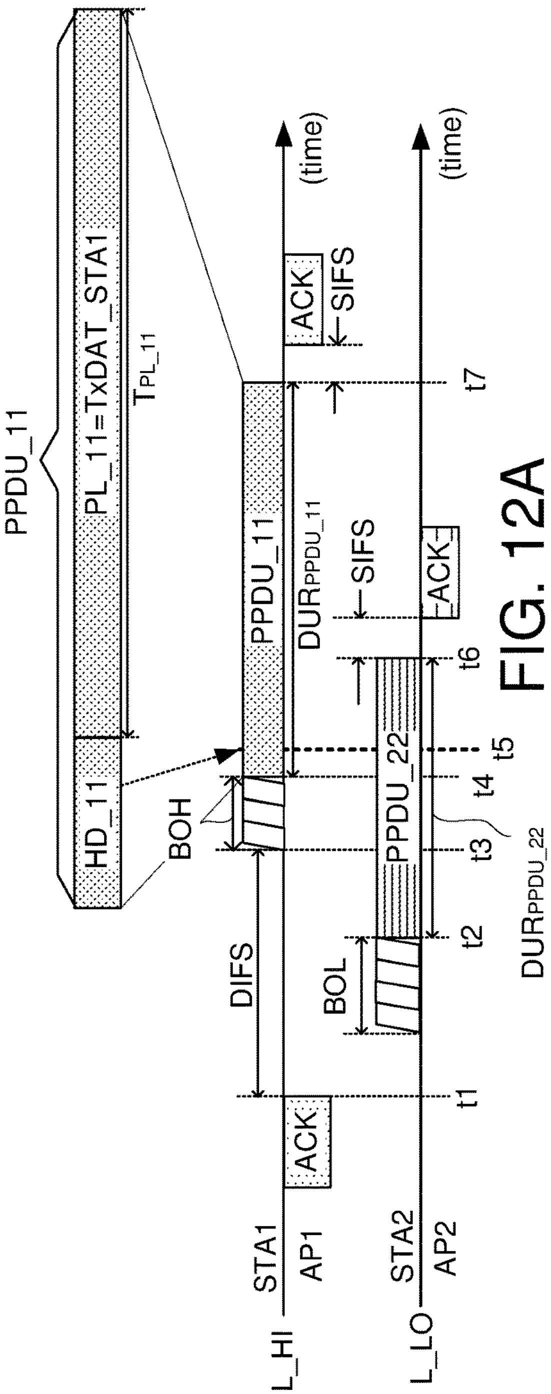
FIG. 12A is a schematic diagram illustrating an occasion when STA2 cannot estimate the end time point of the PPDU_11 frame on the high performance link L_HI.
Figure 12B:
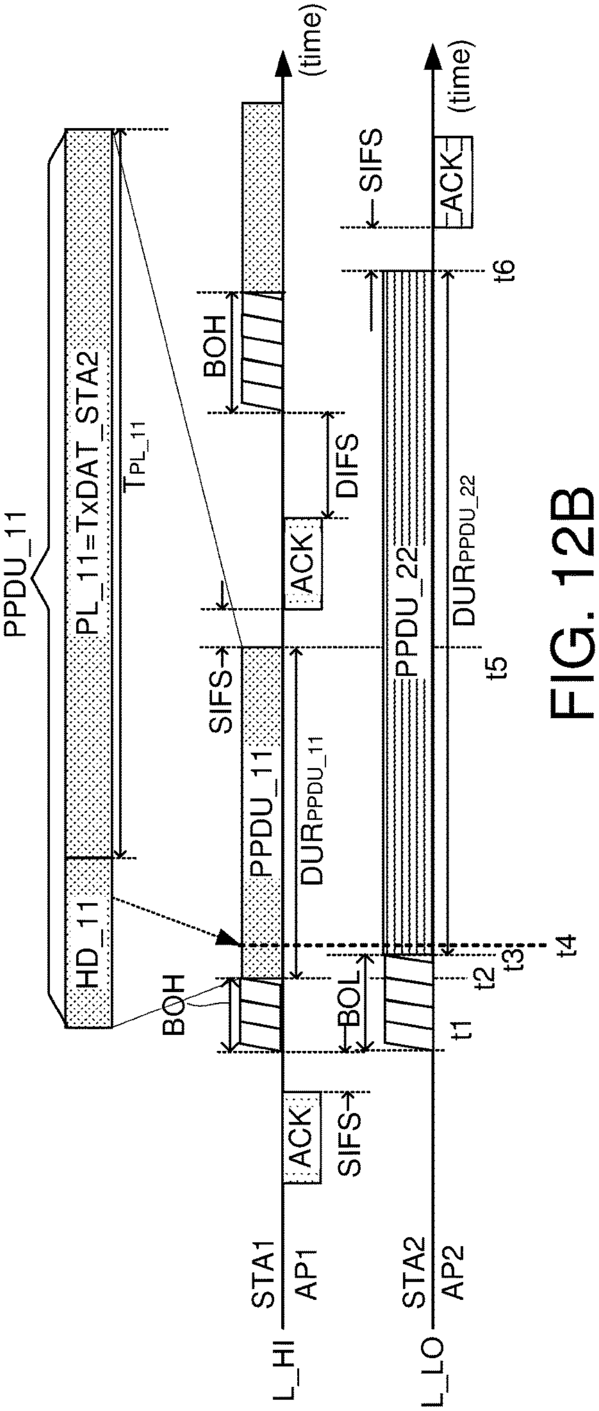
FIG. 12B is a schematic diagram illustrating another occasion when STA2 cannot estimate the end time point of the PPDU_11 frame on the high performance link L_HI.

If the determination result of step S4555*c* is negative, the EMLXR Tx configuration circuit 893 does not control the link-specific MAC (LO) 88 to perform the PPSU_22 frame exchange process. FIGS. 12A and 12B demonstrate problems caused by the conventional EMLXR when the determination result of step S4555*c* is negative.

Figure 14:
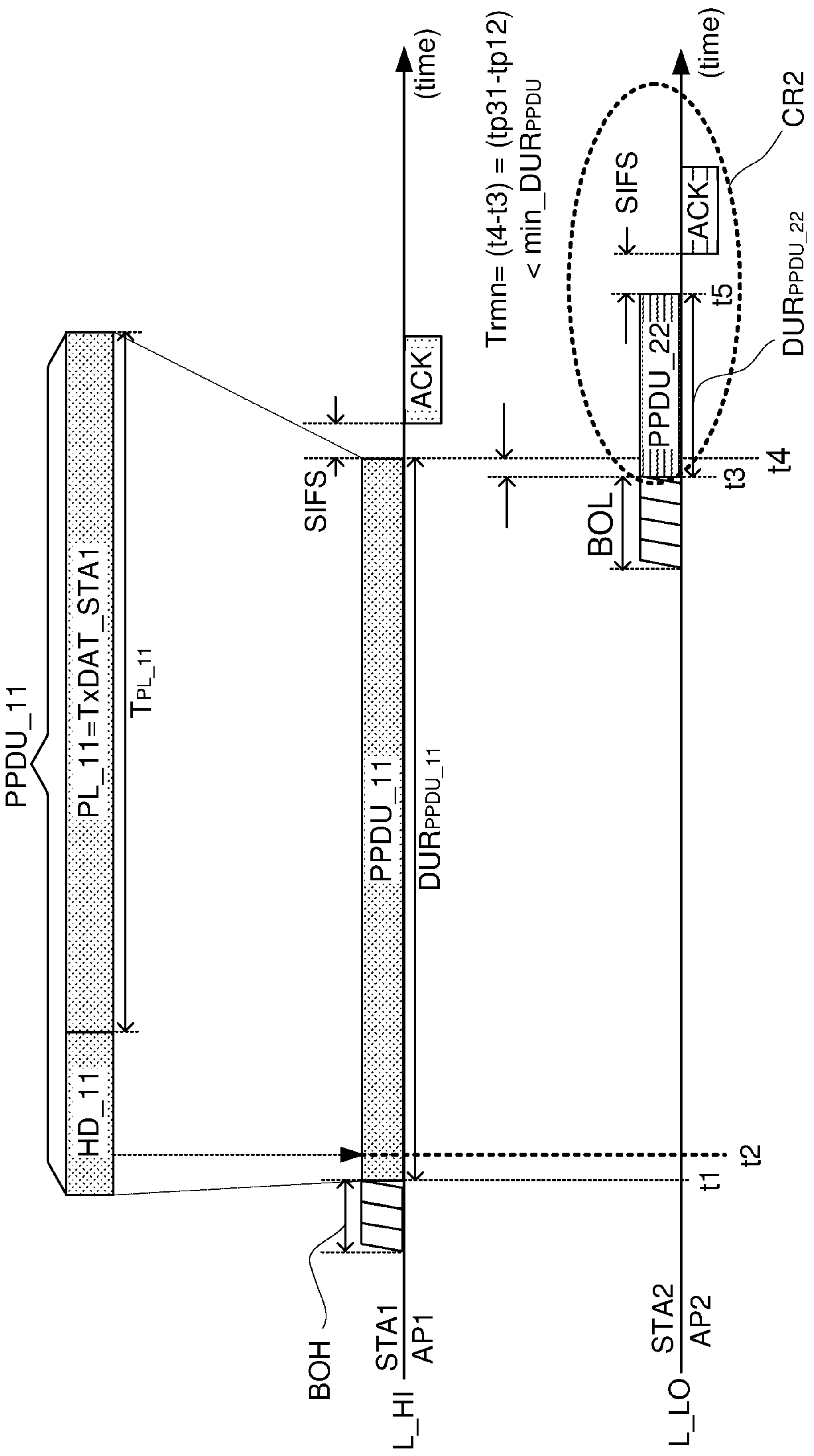
FIG. 14 is a schematic diagram illustrating that the coherent remnant-duration Trmn is shorter than the minimum PPDU duration min_$DUR_{PPDU}$.
Figure 17:
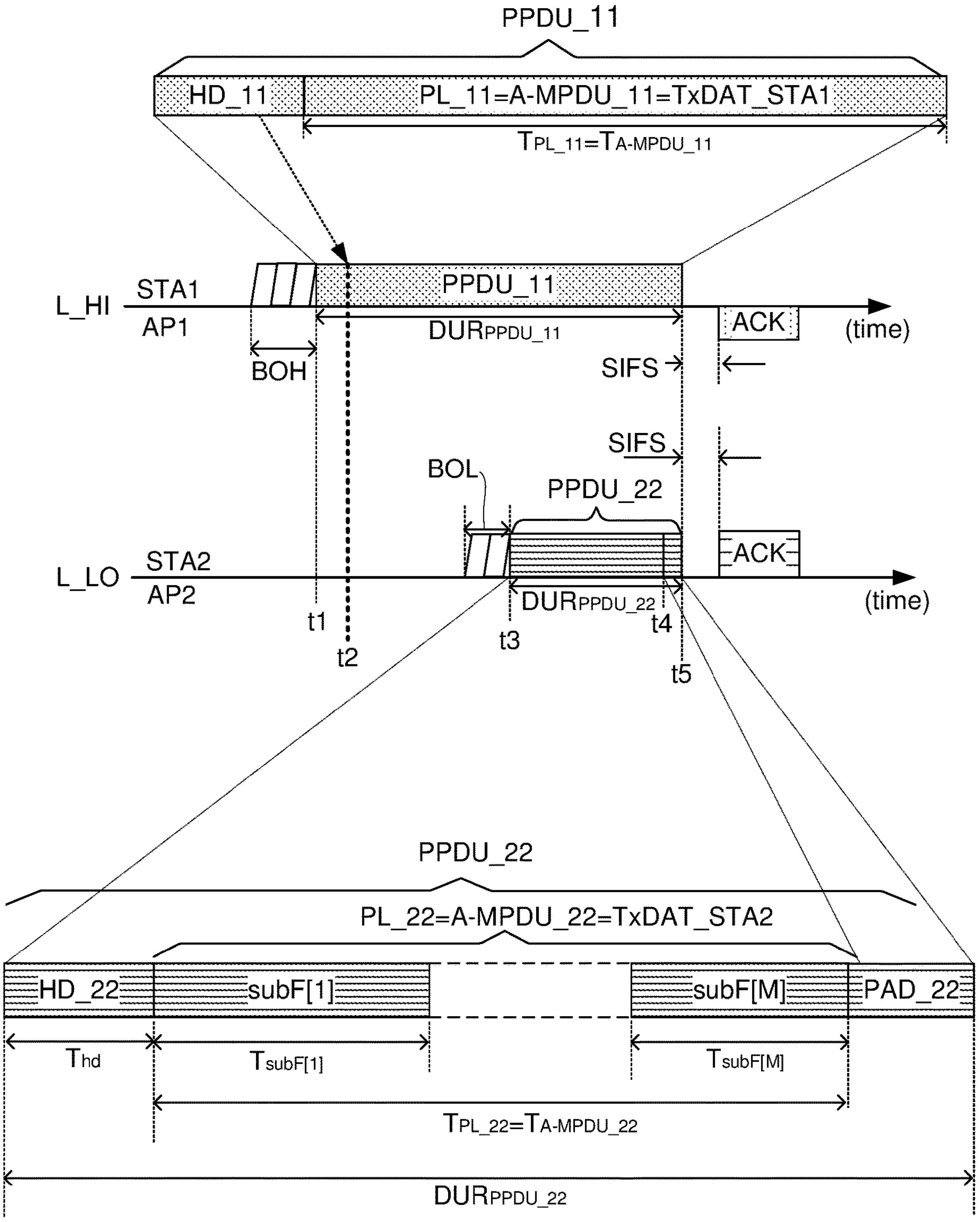
FIG. 17 is a schematic diagram illustrating that the link selection module controls the link-specific MAC (LO) to perform the coherent transmission when the coherent remnant-duration Trmn is longer than the duration of the PPDU_22 frame ($DUR_{PPDU\_22}$).
Figure 19:
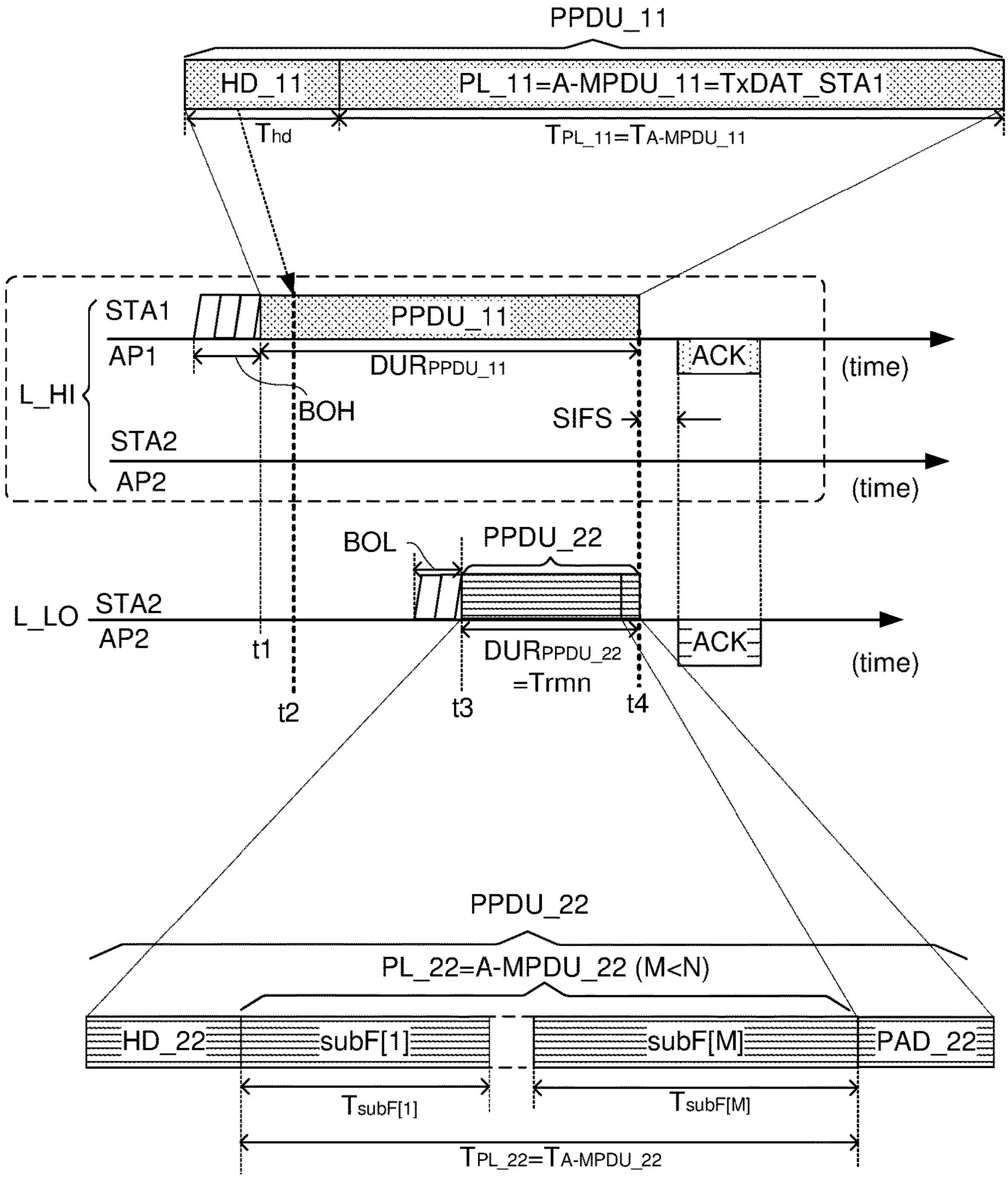
FIG. 19 is a schematic diagram illustrating that the link selection module controls the link-specific MAC (LO) to perform the coherent transmission when the coherent remnant-duration Trmn is shorter than the duration of the PPDU_22 frame ($DUR_{PPDU\_22}$).

FIGS. 14, 17, and 19 correspond to scenarios when the determination result of step S4555*c* is positive. If the determination result of step S4555*c* is positive, the boundary analysis circuit 891 further verifies whether there is sufficient duration for transmitting at least part of the transmission data txDAT_STA2 with the PPDU_22 frame (step S4555*e*). In step S4555*e*, the boundary analysis circuit calculates the coherent remnant-duration Trmn based on the duration information durINFO$_{PL_11}$ associated with the payload portion PL_11 and verifies if the coherent remnant-duration Trmn is greater than the minimum PPDU duration min_DUR$_{PPDU}$ (Trmn>min_DUR$_{PPDU}$).

If the determination result of step S4555*e* is negative, the EMLXR Tx configuration circuit 893 controls the link-specific MAC (LO) 88 not to perform the PPSU_22 frame exchange process. FIG. 14 is an exemplary scenario when the determination result of step S4555*e* is negative.

If the determination result of step S4555*e* is positive, the EMLXR Tx configuration circuit 893 informs the link-specific MAC (LO) 88 to proceed with the PPDU_22 frame exchange process in a coherent transmission manner (see FIGS. 17 and 19) (step S4555*g*).

Please refer to FIG. 5. The transmission data txDAT_STA2 are split into N data subsets subDAT[1]~subDAT[N]. The difference between FIGS. 17 and 19 is whether the coherent remnant-duration Trmn is sufficient for transmitting the N data subsets subDAT[1]~subDAT[N] with M A-MPDU subframes subF[1]~subF[M]. If the coherent remnant-duration Trmn is sufficient for transmitting the N data subsets subDAT[1]~subDAT[N] with the M A-MPDU subframes subF[1]~subF[M] (M=N), the link-specific MAC (LO) 88 transmits the whole transmission data txDAT_STA2 with the PPDU_22 frame (see FIG. 17). Instead, if the coherent remnant-duration Trmn is not sufficient for transmitting the N data subsets subDAT[1]~subDAT[N] with the M A-MPDU subframes subF[1]~subF[M] (M<N), the link-specific MAC (LO) 88 merely transmits part of the transmission data txDAT_STA2 (p of the N data subsets subDAT[1]~subDAT[N]) with the PPDU_22 frame (see FIG. 19).

Figure 10:
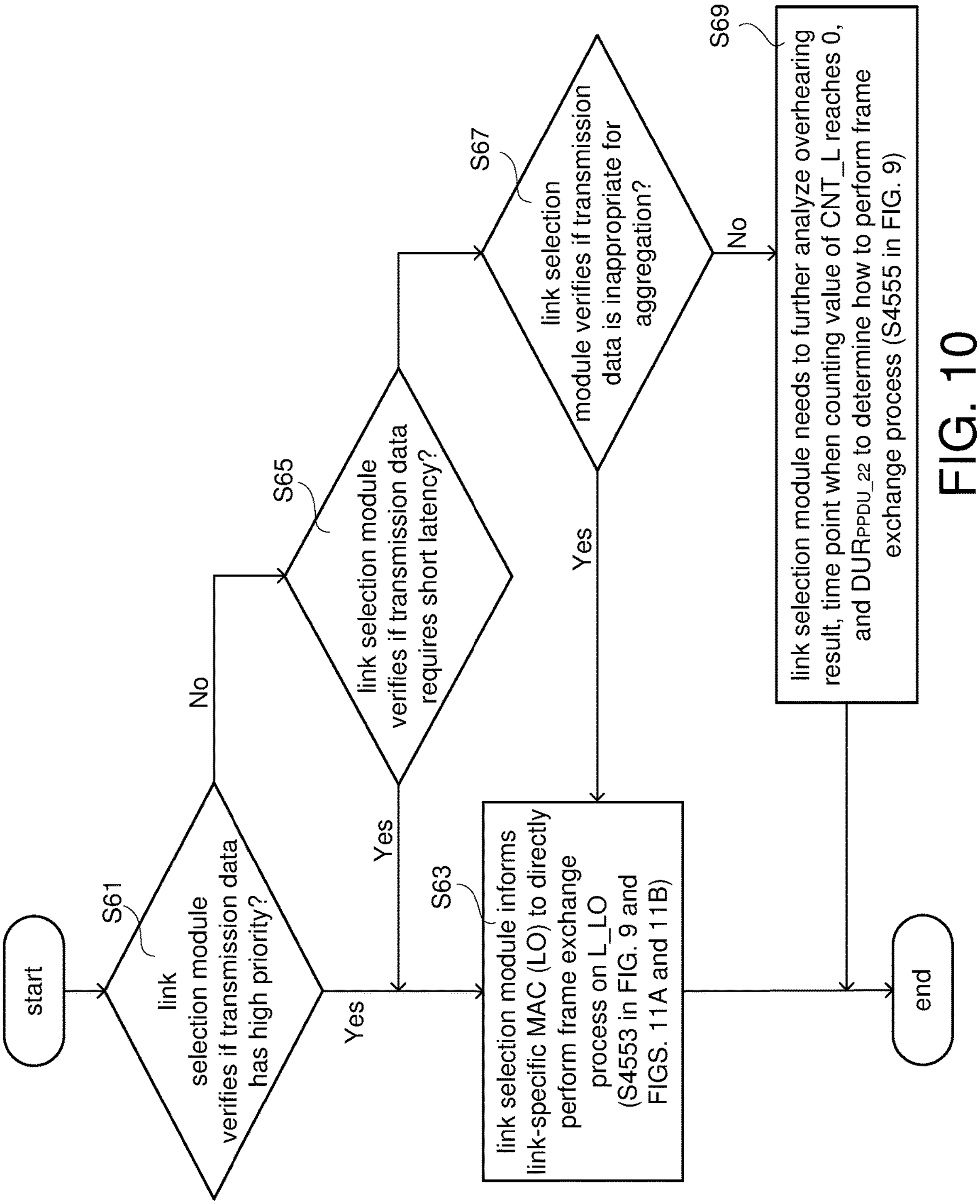
FIG. 10 is a flow diagram illustrating that STA2 performs a frame exchange process on the low performance link L_LO when any of the predefined exception conditions are satisfied.
Figure 11A:
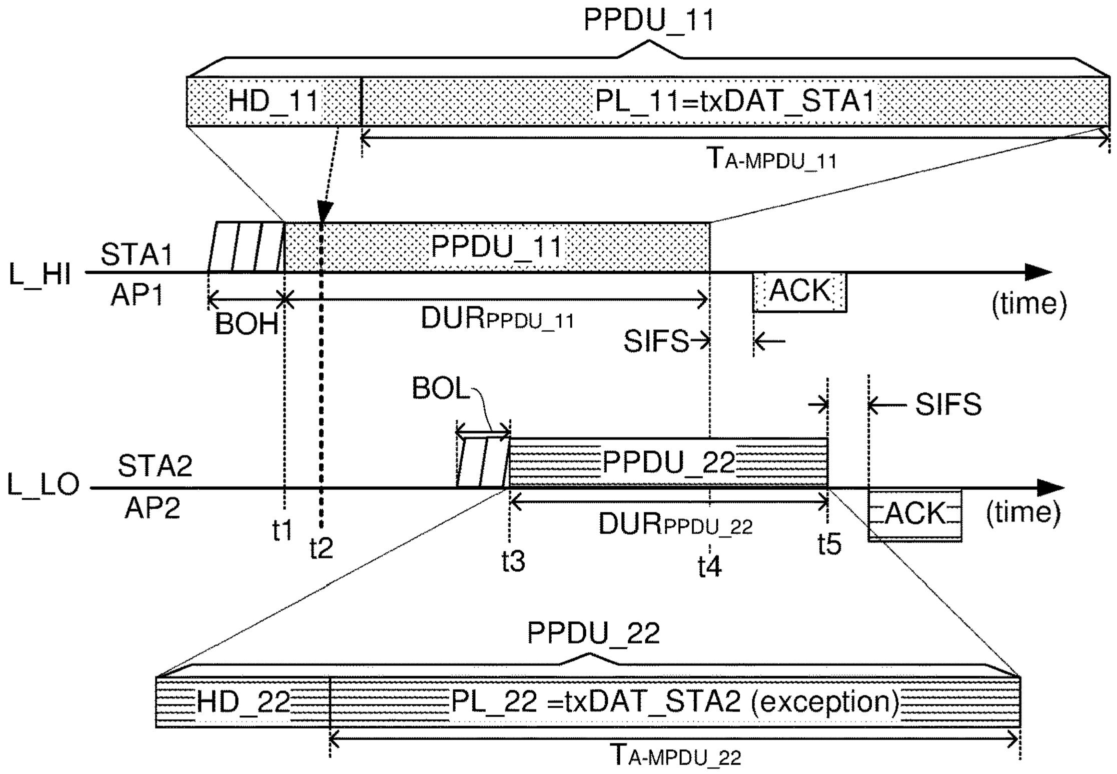
FIGS. 11A and 11B are schematic diagrams illustrating that the high performance channel L_HI is already occupied by STA1, and STA2 determines to perform the PPDU_22 frame exchange process on the low performance link L_LO.
Figure 11B:
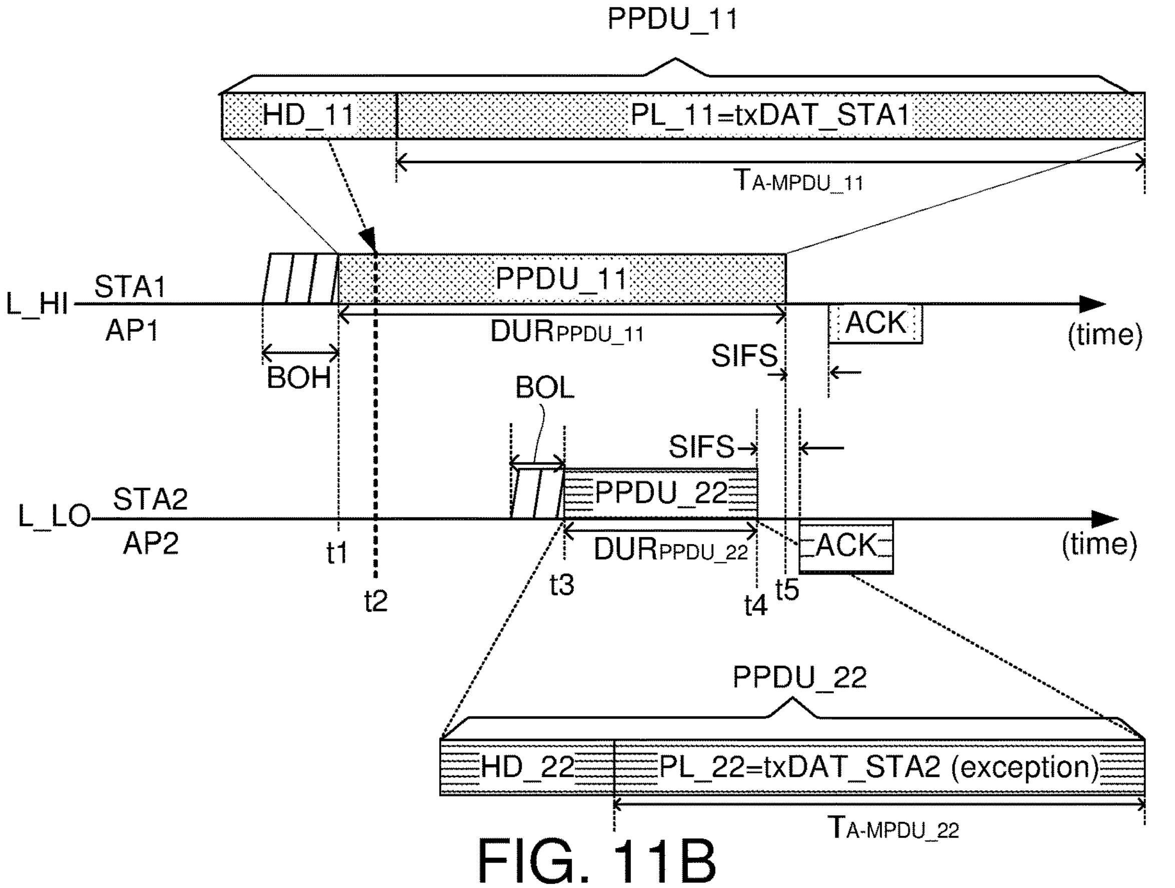

FIG. 10 is a flow diagram illustrating that STA2 performs a frame exchange process on the low performance link L_LO when any predefined exception conditions are satisfied. FIG. 10 corresponds to step S4551 in FIG. 9. Please refer to FIGS. 8 and 10 together.

The link selection module 89 verifies if the transmission data txDAT_STA2 has high priority (step S61). If the determination result of step S61 is positive, the link selection module 89 informs the link-specific MAC (LO) 88 to perform the frame exchange process on the low performance link L_LO (step S63).

If the determination result of step S61 is negative, the link selection module 89 verifies if the transmission data txDAT_STA2 requires short latency (step S65). If the determination result of step S65 is positive, step S63 is performed. Otherwise, the link selection module 89 verifies if the transmission data txDAT_STA2 is inappropriate for aggregation or padding (step S67). If the determination result of step S67 is positive, step S63 is performed. Steps S61, S65, and S67 are examples of predefined exception conditions. In practical applications, the types of predefined exception conditions are not limited.

To summarize, the predefined exception conditions may include, for example, whether the transmission data txDAT_STA2 has high priority, whether the transmission data txDAT_STA2 requires short latency, and/or whether the transmission data txDAT_STA2 is inappropriate for aggregation/padding. In practical applications, the predefined exception conditions are not limited to the examples mentioned herein.

Exemplary procedures of the PPDU_22 frame exchange processes related to step S63 are shown in FIGS. 11A and 11B. In short, FIGS. 11A and 11B correspond to the occasions that the low performance link L_LO is directly selected for the frame exchange process when the PPDU_22 meets any of the predefined exception conditions. These predefined exception conditions represent situations where the transmission data txDAT_STA2 needs to be transmitted as soon as possible. Therefore, in step S63, STA2 chooses to perform the frame exchange process on the low performance link L_LO immediately, without waiting for the access chance on the high performance link L_HI. In step S63, the duration length of the frame exchange process performed on the low performance link L_LO is dominated by the data length of the transmission data txDAT_STA2.

On the other hand, if the determination result of step S67 is negative, the link selection module 89 needs to further analyze the overhearing result of the high performance channel L_HI, the time point when the counting value of the backoff counter CNT_L of STA2 reaches 0, and the duration of the PPDU_22 frame ($DUR_{PPDU\_22}$) (step S69). Step S69 corresponds to step S4555 in FIG. 9, and more details about scenarios related to step S69 are described in FIGS. 12A, 12B, 14, and 16~19.

FIGS. 11A and 11B are schematic diagrams illustrating that the high performance channel L_HI is already accessed by STA1, and STA2 determines to perform the frame exchange process on the low performance link L_LO. In FIGS. 11A and 11B, it is assumed that the data to be transmitted by STA2 (that is, txDAT_STA2) meets at least one of the predefined exception conditions, and STA2 needs to perform the frame exchange process immediately.

In FIGS. 11A and 11B, the backoff procedure of the high performance link BOH ends at the time point t1 (defined as a first-first time point tp11), and STA1 transmits the PPDU_11 frame on the high performance channel L_HI between the time points t1 and t4 (defined as a first-first time point tp31 in FIG. 11A) or between the time points t1 and t5 (defined as a first-first time point tp31 in FIG. 11B). The duration information $durINFO_{PL\_11}$, which reports the duration of the payload portion PL_11 of the PPDU_11 frame, is transmitted from STA1 to AP1 at the time point t2 (defined as a second-first time point tp21).

As STA2 is not busy at the time point t2, STA2 can overhear the duration information $durINFO_{PL\_11}$ on the high performance link L_HI. Alternatively speaking, before the backoff procedure of the low performance link BOL ends at the time point t3, STA2 is aware of the time point when the PPDU_11 frame is scheduled to end (that is, the third-first time point tp31). For example, the PPDU_11 frame ends at the time point t4 (tp31=t4) in FIG. 11A and it ends at the time point t5 (tp31=t5) in FIG. 11B.

In FIGS. 11A and 11B, the backoff procedures of the low performance link BOL end at the time point t3 (defined as a first-second time point tp12). Then, STA2 starts to transmit the PPDU_22 frame immediately. The duration length of the PPDU_22 frame ($DUR_{PPDU\_22}$) is related to the data length of the payload portion PL22, which is directly determined by the data length of the transmission data txDAT_STA2. FIGS. 11A and 11B are similar, except for the duration of the payload portion PL_22 in FIG. 11A is longer than that in FIG. 11B.

In FIG. 11A, the PPDU_22 frame on the low performance link L_LO starts at the time point t3 and ends at the time point t5 (defined as a second-second time point tp22). That is, $DUR_{PPDU\_22}$=t5−t3. In FIG. 11B, the PPDU_22 frame on the low performance link L_LO starts at the time point t3 and ends at the time point t4 (defined as a second-second time point tp22). That is, $DUR_{PPDU\_22}$=t4−t3=tp22−tp12.

According to FIGS. 11A and 11B, if its transmission data (txDAT_STA2) meets at least one of the predefined exception conditions, STA2 starts to transmit the PPDU_22 frame without considering the end time point of the PPDU_11 frame (time point tp31=t4 in FIG. 11A, and time point tp31=t5 in FIG. 11B). Examples of the predefined exception conditions can be referred to steps S61, S65, and S67 in FIG. 10.

As the transmission data txDAT_STA2 is encapsulated in the PPDU_22 frame, the duration of the PPDU_22 frame ($DUR_{PPDU\_22}$) is changed with the data length of the transmission data txDAT_STA2. The longer the transmission data txDAT_STA2 is, the longer the duration of the PPDU_22 frame ($DUR_{PPDU\_22}$) is required. In FIG. 11A, the PPDU_22 frame (between time points t3 and t5) ends later than the PPDU_11 frame (between time points t1 and t4) because the data length of the transmission data txDAT_STA2 is longer. In FIG. 11B, the PPDU_22 frame (between time points t3 and t4) ends earlier than the PPDU_11 frame (between time points t1 and t5) because the data length of the transmission data txDAT_STA2 is shorter.

When the predefined quality condition is not satisfied, the link selection module 211*a* selects the conventional EMLXR for data transmission (step S43 in FIG. 4). When the predefined quality condition is satisfied, the link selection module 211*a* dynamically switches its transmission configuration based on considering different timing combinations (that is, relationships between the time points tp11, tp21, tp31, tp12, and tp22) (step S45 in FIG. 4). Various transmission configurations are illustrated below.

Based on the illustrations in FIGS. 4, 9, 10, 11A, and 11B, the link selection module 89 provides transmission configurations as follows. When the predefined quality condition is satisfied, STA2 first checks if it can gain access right on the high performance link L_HI. Suppose the predefined quality condition is satisfied and link selection module 89 learns from the backoff counter CNT_HI that the link-specific MAC (HI) could gain access right on the high performance link L_HI, STA2 directly chooses the high performance link L_HI for data transmission (step S453 in FIG. 4). On the other hand, when the predefined quality condition is satisfied, and the link selection module 89 learns from the backoff counter CNT_LO that the link-specific MAC (LO) could gain the access right on the low performance link L_LO, STA2 does not directly choose the low performance link L_HO for data transmission. Instead, STA2 must consider more issues before selecting its transmission configuration (step S455 in FIG. 4).

FIG. 12A is a schematic diagram illustrating an exemplary situation in which STA2 cannot estimate the end time point of the PPDU_11 frame on the high performance link L_HI. In FIG. 12A, when STA1 transmits the duration information $durINFO_{PL\_11}$ on the high performance link L_HI at the time point t5 (defined as a second-first time point tp21), STA2 cannot acquire the duration information $durINFO_{PL\_11}$ on the high performance link L_HI because STA2 is busy at proceeding the PPDU_22 frame exchange process on the low performance link L_LO. Consequentially, STA2 is incapable of estimating/calculating the end time point of the PPDU_11 frame (that is, the third-first time point tp31) based on the duration information $durINFO_{PL\_11}$.

The DIFS duration of the high performance link L_HI of STA1 starts at the time point t1 and ends at the time point t3. Thus, STA2 cannot take advantage of the high performance link L_HI until the time point t3. At the time point t2 (defined as a first-second time point tp12), the backoff procedure of the low performance link BOL of STA2 ends. Then, the PPDU_22 frame starts at the time point t2 and ends at the time point t6 (defined as a second-second time point tp22). That is, $DUR_{PPDU\_22}$=t6−t2=tp22−tp12.

The backoff procedure of the high performance link L_HI (BOH) of STA1 starts at the time point t3 and ends at the time point t4 (defined as a first-first time point tp11). Then, the PPDU_11 frame is transmitted between the time points t4 and t7 (defined as a third-first time point tp31). That is, $DUR_{PPDU\_11}$=(t7−t4)=tp31−tp11. During the PPDU_11 frame ($DUR_{PPDU\_11}$), the duration information $durINFO_{PL\_11}$ is transmitted at the time point t5 (defined as a second-first time point tp21).

By the time (time point t5=tp21) that STA1 transmits the duration information $durINFO_{PL\_11}$, STA2 is already transmitting the PPDU_22 frame ($DUR_{PPDU_}$22=(t6−t2)). Therefore, STA2 cannot overhear the status of the high performance link L_HI at the time point tp21. Without the duration information durINFO$_{PL_11}$, STA2 cannot estimate the end time point (that is, the time point t7=tp31) of the PPDU_11 frame.

FIG. 12B is a schematic diagram illustrating another example situation in that STA2 cannot estimate the end time point of the PPDU_11 frame on the high performance link L_HI. In FIG. 12B, STA2 cannot estimate the end time point of the PPDU_11 frame on the high performance link L_HI because STA2 is already in transmitting the PPDU_22 frame (DUR$_{PPDU_22}$=(t6−t3)) when STA1 transmits the duration information durINFO$_{PL_11}$ on the high performance link L_HI at the time point t4 (defined as a second-first time point tp21).

At the time point t2 (defined as a first-first time point tp11), the backoff procedure of the high performance link BOH of STA1 ends, and AP1 starts to transmit the PPDU_11 frame. The PPDU_11 frame (DUR$_{PPDU_11}$) is transmitted between the time points t2 and t5 (defined as a third-first time point tp31), and the header portion having the duration information durINFO$_{PL_11}$ is transmitted at the time point t4 (defined as a second-first time point tp21).

The backoff counter CNT_LO of STA2 starts to count down at the time point t1 and ends at 0 at the time point t3 (defined as a first-second time point tp12). Therefore, at the moment (time point t4) that AP1 transmits the duration information durINFO$_{PL_11}$, STA2 is already transmitting the PPDU_22 frame (DUR$_{PPDU_22}$=(t6−t3)). Accordingly, STA2 cannot listen to the status of the high performance link L_HI at the time point t4=tp21 when STA1 sends the duration information durINFO$_{PL_11}$.

Please refer to FIGS. 3 and 12A~12B together. According to the classification in FIG. 3, FIGS. 12A and 12B represent the situations in which the duration information durINFO$_{PL_11a}$ and durINFO$_{PL_11b}$ cannot be successfully detected by STA2. FIGS. 12A and 12B demonstrate that, if the time point tp21 (time point t3 in FIG. 12A, or time point t4 in FIG. 12B) that STA1 transmits the duration information durINFO$_{PL_11}$ is within the duration of the PPDU_22 frame (for example, between time points t2~t6 in FIG. 12A, or between time points t3~t6 in FIG. 12B), STA2 is incapable of overhearing the duration information durINFO$_{PL_11}$, nor calculating the end time point of the PPDU_11 frame (that is, the time point tp31).

In contrast to FIGS. 12A and 12B, there are situations that STA2 can successfully acquire the duration information durINFO$_{PL_11}$. For these situations, the link selection module 89 calculates a coherent remnant-duration Trmn based on the acquired duration information durINFO$_{PL_11}$. Then, the acquired duration information durINFO$_{PL_11}$ is utilized to calculate the coherent remnant-duration Trmn, and the coherent remnant-duration Trmn is compared with a minimum PPDU duration min_DUR$_{PPDU}$. More details about the minimum PPDU duration min_DUR$_{PPDU}$ can be referred to FIG. 13.

The coherent remnant-duration Trmn is the time difference between the end time point of the PPDU frame performed by STA1 on the high performance link L_HI and the end time point of the backoff procedure of the low performance link BOL of STA2 (that is, Trmn=(tp31−tp12)). As the transmission operations of STA1 and STA2 are independent, the actual duration length of the coherent remnant-duration Trmn is not a constant value.

Based on the definition of the coherent remnant-duration Trmn (that is, Trmn=tp31−tp12), the length of the coherent remnant-duration Trmn is varied with the end time point of the PPDU frame on the high performance link L_HI (that is, the third-first time point tp31) and the end time point of the backoff procedure of the low performance link BOL (that is, the first-second time point tp12). Therefore, STA2 needs to know the end time point of the PPDU_11 frame (that is, the third-first time point tp31) in advance to calculate the coherent remnant-duration Trmn. Moreover, STA2 needs to acquire the duration information durINFO$_{PL_11}$ on the high performance link L_HI to know the end time point of the PPDU_11 frame (that is, the third-first time point tp31).

For the situations shown in FIGS. 12A and 12B, the coherent remnant-duration Trmn is unavailable for STA2 because STA2 does not have the chance to overhear the duration information durINFO$_{PL_11}$ on the high performance link L_HI. Consequentially, the end time point of the PPDU frame on the high performance link L_HI (that is, the third-first time point tp31) cannot be successfully estimated, nor the coherent remnant-duration Trmn can be calculated.

In some applications, the STA2 can overhear the duration information durINFO$_{PL_11}$ on the high performance link L_HI at the second-first time point tp21 and estimate the end time point of the PPDU_11 frame (that is, the third-first time point tp31) accordingly. When the end time point of the PPDU_11 frame can be successfully calculated/estimated, the coherent remnant-duration Trmn can be calculated. Later, the boundary analysis circuit 891 compares the coherent remnant-duration Trmn with the minimum PPDU duration (min_DUR$_{PPDU}$).

After comparison, the comparison result is transmitted to the EMLXR Tx configuration circuit 893. The EMLXR Tx configuration circuit 893 refers to the comparing result (Trmn≥min_DUR$_{PPDU}$, or Trmn<min_DUR$_{PPDU}$) to determine which transmission configuration suits the PPDU_22 frame and the link status better.

The payload portion of the PPDU_22 frame is preferred to be constructed by aggregating one or multiple A-MPDU subframes subF[1]~subF[M] to enhance the transmission throughput. The duration of the first A-MPDU subframe subF[1], qualified for the transmission, defines the minimum PPDU duration min_DUR$_{PPDU}$. In other words, the minimum PPDU duration min_DUR$_{PPDU}$ refers to the duration of a PPDU that contains only the first A-MPDU subframe that is qualified for transmission.

Figure 13:
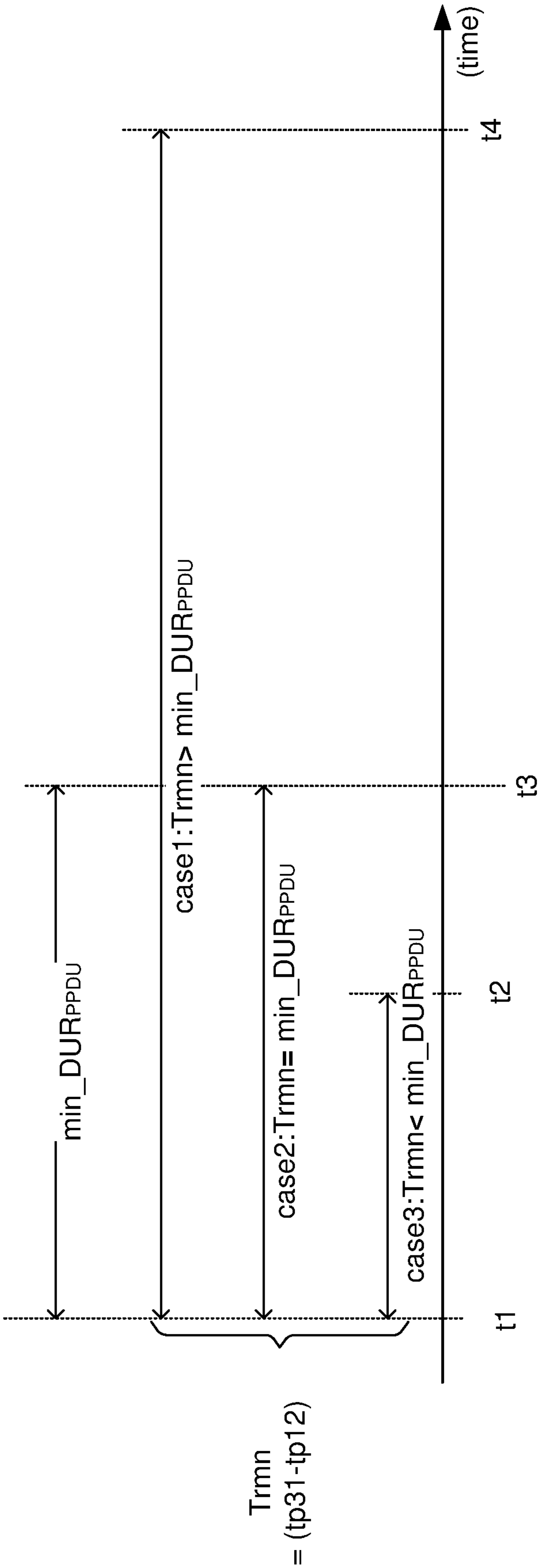
FIG. 13 is a schematic diagram illustrating different results reflecting comparisons between the minimum PPDU duration min_$DUR_{PPDU}$ and the coherent remnant-duration Trmn.

FIG. 13 is a schematic diagram illustrating different results reflecting comparisons between the minimum PPDU duration min_DUR$_{PPDU}$ and the coherent remnant-duration Trmn. The minimum PPDU duration min_DUR$_{PPDU}$ is time period between the time points t1 and t3 (min_DUR$_{PPDU}$=t3−t1).

In the first situation (case1), the coherent remnant-duration Trmn is assumed to be between the time points t1 and t4 (Trmn=t4−t1), and the coherent remnant-duration Trmn is longer than the minimum PPDU duration min_DUR$_{PPDU}$ (that is, Trmn=t4−t1>min_DUR$_{PPDU}$=t3−t1). In the second situation (case2), the coherent remnant-duration Trmn is assumed to be between the time points t1 and t3 (Trmn=t3−t1), and the coherent remnant-duration Trmn is equivalent to the minimum PPDU duration (that is, Trmn=min_DUR$_{PPDU}$=t3−t1).

According to the embodiments of the present disclosure, STA2 selects to perform the coherent transmission for the first and the second situations. Please refer to FIGS. 15, 16A, 16B, 17, 18A, 18B, and 19 for further classification of the scenarios of the first and the second situations.

For the third situation (case3), the coherent remnant-duration Trmn is assumed to be between the time points t1 and t2 (Trmn=t2−t1), and the coherent remnant-duration Trmn is shorter than the minimum PPDU duration min_D-

$UR_{PPDU}$ (that is, Trmn=t2−t1<min_$DUR_{PPDU}$=t3−t1). Under such circumstances, the link selection module 89 knows that the coherent remnant-duration Trmn is too short for the link-specific MAC (LO) 88 to transmit any of the A-MPDU subframes qualified for being transmitted first. Accordingly, the TxMAC(LO) 883 does not transmit any part of the transmission data txDAT_STA2 for the third situation (case 3).

FIG. 14 is a schematic diagram illustrating that the coherent remnant-duration Trmn is shorter than the minimum PPDU duration min_$DUR_{PPDU}$ (Trmn<min_$DUR_{PPDU}$). For such a situation, STA2 pauses the transmission of the transmission data txDAT_STA2 on the low performance link L_LO.

The backoff procedure of the high performance link BOH ends at the time point t1 (defined as a first-first time point tp11), and the PPDU_11 frame lasts between the time points t1 and t4 (defined as a third-first time point tp31). That is, $DUR_{PPDU\_11}$=(t4−t1). The header portion HD_11 of the PPDU_11 frame reports the duration information durIN-$FO_{PL_11}$ at time point t2 (defined as a second-first time point tp21).

As STA2 is not occupied at the time point t2, STA2 can overhear the status of the high performance link L_HI and successfully acquire the duration information durIN-$FO_{PL_11}$. With the duration information durIN$FO_{PL_11}$, STA2 can calculate/estimate that the PPDU_11 frame will end at t4 (defined as a third-first time point tp31).

On the low performance link L_LO, the counting value of the backoff counter CNT_LO of STA2 reaches 0 at the time point t3. Thus, STA2 can calculate the coherent remnant-duration Trmn based on the end time point of the backoff procedure of the low performance link BOL (time point t3, that is, the second-first time point tp21) and the estimated end time point of the PPDU_11 frame (time point t4, that is, the third-first time point tp31). That is, Trmn=t4−t3=tp31−tp12.

In FIG. 14, the BOL ends at the time point t3 (defined as a first-second time point tp12), and STA2 gets access right on the low performance link L_HO. On the other hand, the high performance link L_HI is still used by STA1. Therefore, the conventional STA2 transmits the PPDU_22 frame between the time points t3 and t5 (defined as a second-second time point tp22).

FIG. 14 represents that the available coherent remnant-duration Trmn=(t4−t3) is not sufficient for STA2 to complete the transmission of a minimum PPDU duration (min_$DUR_{PPDU}$) on the low performance link L_LO. In FIG. 14, a dotted circle CR2 is shown. The frame exchange processes circulated in dotted circle CR2 are performed in the conventional approach but removed according to the embodiments of the present disclosure. When STA2 encounters a situation in which the coherent remnant-duration Trmn is too short, like FIG. 14, the EMLXR Tx configuration circuit 893 should control the link-specific MAC (LO) 88 to skip the PPDU_22 frame exchange process.

Please refer to FIGS. 9, 12A, 12B, and 14 together. FIGS. 12A and 12B represent the situation when the determination result of step S4555*c* is negative, and FIG. 14 represents the situation when the determination result of step S4555*e* is negative. For situations like FIGS. 12A, 12B, and 14, STA2 assumes that the direct access on the low performance link L_LO is inefficient and prefers to wait for the next access chance of the high performance link L_HI. Thus, the transmission is paused, and the situations described in FIGS. 12A, 12B, and 14 will not happen when the embodiments of the present disclosure are adopted.

When the coherent remnant-duration Trmn is sufficient for a PPDU frame with the minimum PPDU duration min_$DUR_{PPDU}$, STA2 needs to further compare the length of the coherent remnant-duration Trmn with the duration of the PPDU_22 frame ($DUR_{PPDU\_22}$) to know whether the transmission data txDAT_STA2 can be transmitted with one PPDU frame or not. FIGS. 15, 16A, 16B, 17, 18A, 18B, and 19 further analyze how the link selection module 89 determines that the link-specific MAC (LO) 88 should transmit the whole or only part of the transmission data txDAT_STA2.

When the coherent remnant-duration Trmn is longer than or equivalent to the minimum PPDU duration (min_$DUR_{PPDU}$), the EMLXR Tx configuration circuit 893 can inform the link-specific MAC (LO) 88 to transmit the PPDU_22 coherently. Then, FIG. 15 is executed.

Figure 15:
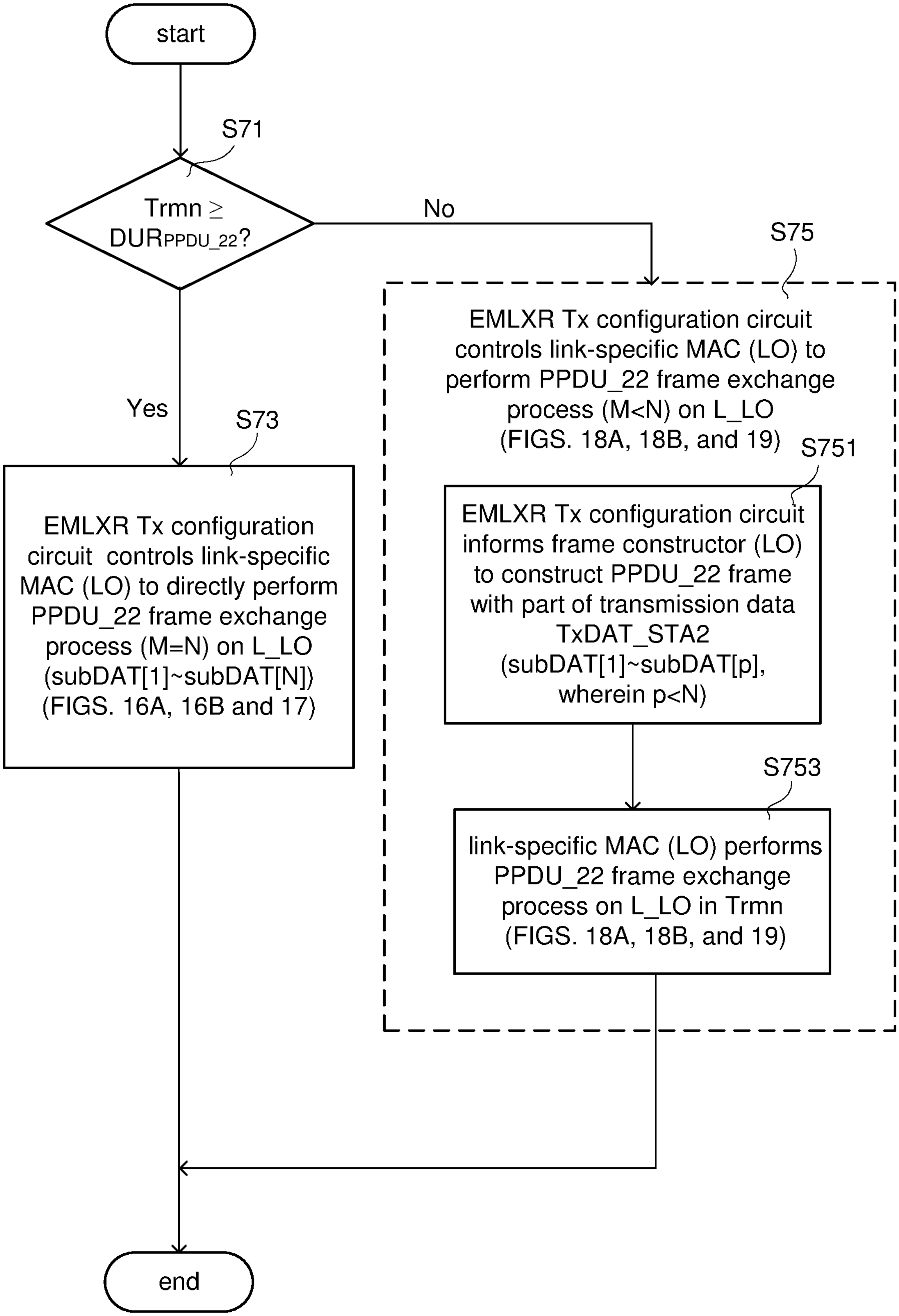
FIG. 15 is a flow diagram illustrating an exemplary implementation of step S4555*g* in FIG. 9.

FIG. 15 is a flow diagram illustrating an exemplary implementation of step S4555*g* in FIG. 9. FIG. 15 corresponds to the situations that the link selection module 89 selects to perform coherent transmission. When the coherent transmission proceeds, STA1 and STA2 respectively precede their corresponding frames on the high performance link L_HI and the low performance link L_LO parallelly during the coherent remnant-duration Trmn. That is, during the coherent remnant-duration Trmn, STA2 transmits the PPDU_22 frame on the low performance link L_LO, and STA1 transmits the PPDU_11 frame on the high performance link L_HI.

Firstly, the EMLXR Tx configuration circuit 893 verifies if the coherent remnant-duration Trmn is longer than or equivalent to the duration required to transmit the whole transmission data txDAT_STA2 with one PPDU_22 frame (Trmn≥$DUR_{PPDU\_22}$?) (step S71). Accordingly, the EMLXR Tx configuration circuit 893 knows whether more than one PPDU_22 frame is required to transmit the transmission data txDAT_STA2.

If the determination result of step S71 is positive, the EMLXR Tx configuration circuit 893 informs the link-specific MAC (LO) 88 to directly perform the PPDU_22 frame exchange process on the low performance link L_LO (step S73). Thus, the transmission data txDAT_STA2 is transmitted by a single PPDU_22 frame. Details about step S73 can be referred to FIGS. 16A, 16B, and 17.

If the determination result of step S71 is negative, the boundary analysis circuit 891 reports to the EMLXR Tx configuration circuit 893 that the duration required to transmit the whole transmission data txDAT_STA2 is too long for the coherent remnant-duration Trmn, and the EMLXR Tx configuration circuit 893 informs the link-specific MAC (LO) 88 to perform the EMLXR-based txOnRx alignment (step S75). Then, the transmission data txDAT_STA2 is transmitted by more than one PPDU_22 frame. Details about step S75 can be referred to FIGS. 18A, 18B, and 19.

In practical applications, instead of transmitting the boundary analysis result to the EMLXR Tx configuration circuit 893, the boundary analysis circuit 891 might directly inform the link-specific MAC (LO) 88 to proceed with step S75. Alternative designs can be implemented in practical applications.

Figure 16A:
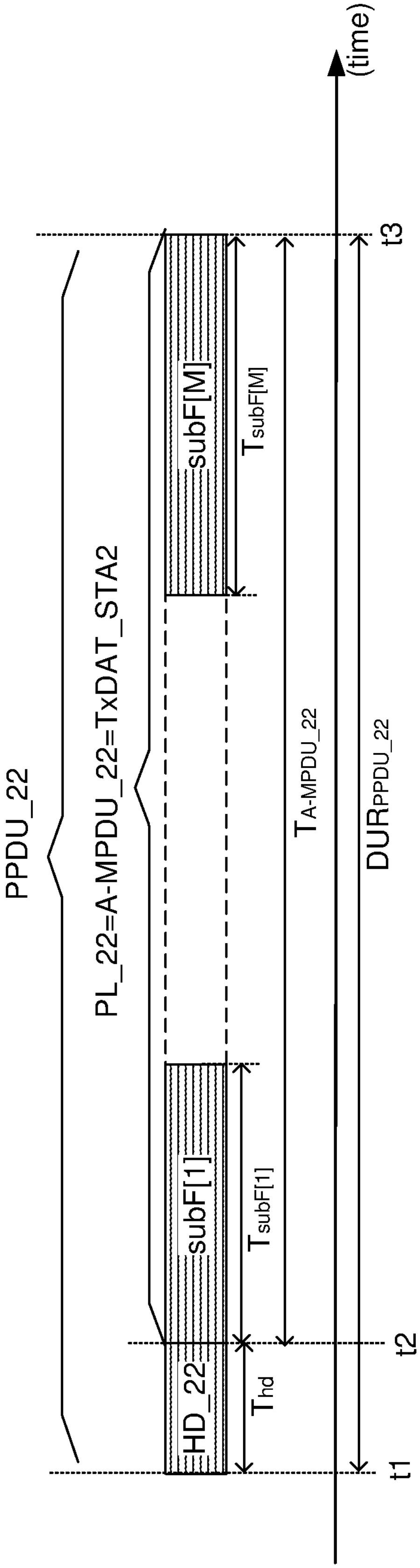
FIGS. 16A and 16B are schematic diagrams illustrating that the number of A-MPDU subframes subF[1]~subF[M] of the payload portion of the PPDU_22 frame is equivalent to the number of the data subsets subDAT[n]~subDAT[N] (M=N) when the coherent remnant-duration Trmn is longer than the duration of the PPDU_22 frame($DUR_{PPDU\_22}$).
Figure 16B:
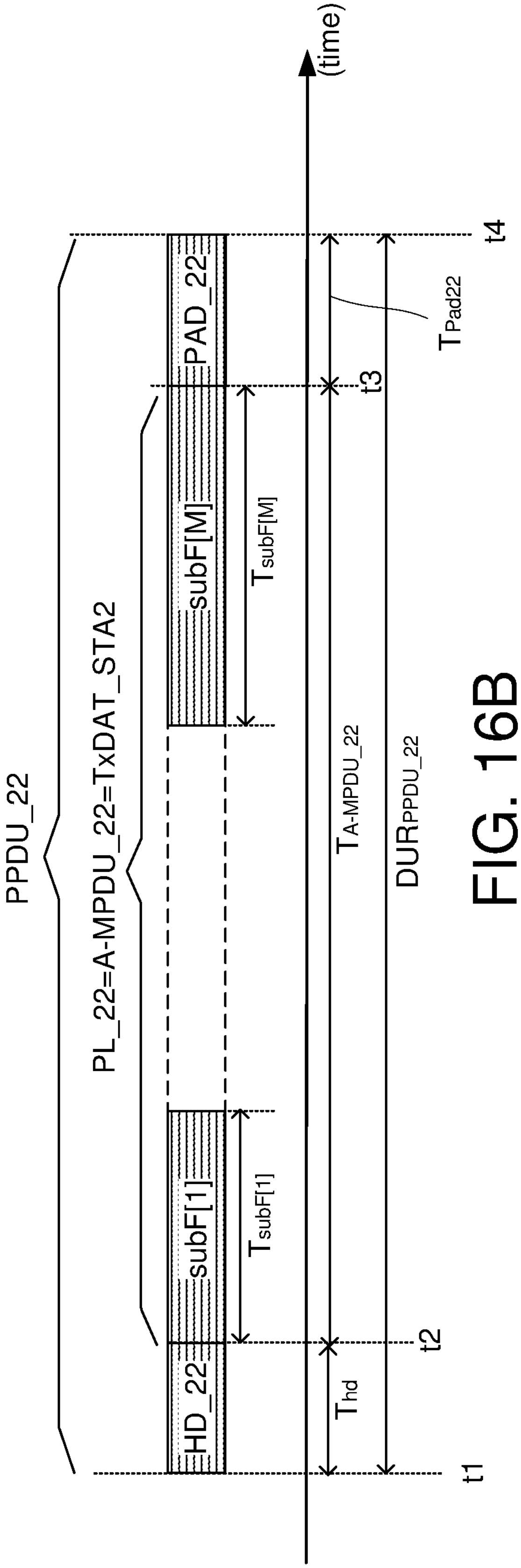

FIGS. 16A and 16B are schematic diagrams illustrating that the M A-MPDU subframes subF[1]~subF[M] of the payload portion of the PPDU_22 frame are capable of carrying all the N data subsets subDAT[n]~subDAT[N] (M=N) when the coherent remnant-duration Trmn is longer than the duration of the PPDU_22 frame ($DUR_{PPDU\_22}$). FIGS. 16A and 16B are generally similar, except that padding bits (dummy bits) are further added in FIG. 16B.

In FIG. 16A, the coherent remnant-duration Trmn is equivalent to the summation of the duration of the header portion HD_22 and the durations of all M A-MPDU subframes subF[1]~subF[M]. That is, Trmn=$T_{hd}$+($T_{subF[1]}$+ . . . $T_{subF[M]}$)=(t3−t1). Thus, the PPDU_22 frame is constructed with the header portion HD_22 and A-MPDU subframes subF[1]~subF[M].

In FIG. 16B, the coherent remnant-duration Trmn is longer than the summation of the duration of the header portion HD_22 ($T_{hd}$), and the duration of all M A-MPDU subframes subF[1]~subF[M] ($T_{subF}$[1]+ . . . +$T_{subF[M]}$). That is, Trmn=(t4−t1)>$T_{hd}$+($T_{subF}$[1]+ . . . $T_{subF[M]}$)=(t3−t1). Thus, one or more padding bits are added to an extended padding duration $T_{Pad22}$=(t4−t3) to extend the duration of the PPDU_22 frame ($DUR_{PPDU\_22}$). Consequentially, the PPDU_22 frame is constructed with the header portion HD_22, the payload portion including A-MPDU subframes subF[1]~subF[M], and one or more padding bits PAD_22.

In both FIGS. 16A and 16B, the number of the A-MPDU subframes (M) is equivalent to the number of data subsets subDAT[1]~subDAT[N] (M=N). Therefore, each of the data subset subDAT[1]~subDAT[N] is carried by one of the A-MPDU subframes subF[1]~subF[M].

FIG. 17 is a schematic diagram illustrating that the link selection module controls the link-specific MAC (LO) to perform the coherent transmission when the coherent remnant-duration Trmn is longer than the duration of the PPDU_22 frame ($DUR_{PPDU\_22}$).

When the duration of the PPDU_22 frame ($DUR_{PPDU\_22}$) is shorter than or equivalent to the coherent remnant-duration Trmn ($DUR_{PPDU\_22}$ Trmn), the TxMAC(LO) 883 can finish transmitting the PPDU_22 frame by the end time point of the PPDU_11 frame (defined as a third-first time point tp31). In other words, the end time point of the PPDU_22 frame may be earlier than or aligned with the time point t5.

The counting value of the backoff counter CNT_HI of STA1 reaches 0 at the time point t1, and the PPDU_11 frame is transmitted between the time points t1 (defined as a first-first time point tp11) and t5 (defined as a third-first time point tp31). That is, $DUR_{PPDU\_11}$=(t5−t1). The header portion HD_11 of the PPDU_11 frame carrying the duration information durINFO$_{PL_11}$ is transmitted at the time point t2 (defined as a second-first time point tp21).

As the duration information durINFO$_{PL_11}$ is overheard by STA2 at the time point t2, the boundary analysis circuit 891 knows that the PPDU_11 frame will end at the time point t5. Therefore, the boundary analysis circuit 891 calculates the coherent remnant-duration Trmn based on the difference between the end time point of the PPDU_11 frame (time point t5) and the end time point of the backoff procedure of the low performance link BOL (time point t3, as a first-second time point tp12). That is, Trmn=(t5−t3) in FIG. 17.

Meanwhile, the boundary analysis circuit 891 receives the transmission data txDAT_STA2 from the wireless control circuit 85 and knows the duration required to transmit the transmission data txDAT_STA2 ($DUR_{PPDU\_22}$). In FIG. 17, as the duration of the PPDU_22 frame for transmitting the whole transmission data txDAT_STA2 is shorter than the coherent remnant-duration Trmn ($DUR_{PPDU\_22}$<Trmn=(t5−t3)), the boundary analysis circuit 891 knows that the PPDU_22 frame will end at the time point t4 (that is, before the time point t5). In FIG. 17, one or more padding bits are added in the extended padding duration $T_{Pad22}$ between the time points t4 and t5. The boundary analysis circuit 891 informs the duration comparison result to the EMLXR Tx configuration circuit 893. Then, the (EMLXR Tx configuration circuit 893 controls the frame constructor (LO) to add the padding bits to the PPDU_22 frame accordingly.

Therefore, once the counting value of the backoff counter CNT_LO of STA2 reaches 0 at the time point t3, the EMLXR Tx configuration circuit 893 controls the TxMAC (LO) 883 to transmit the PPDU_22 frame immediately. Then, the header portion HD_22 and the payload portion PL_22 of the PPDU_22 frame are transmitted between the time points t3 and t4, and one or more padding bits are transmitted between the time points t4 and t5.

In FIG. 17, the PPDU_11 frame ends at the time point t5, and the payload portion PL_22 of the PPDU_22 frame ends at the time point t4. The duration between the time points t4 and t5 is an extended padding duration $T_{Pad22}$ ($T_{Pad22}$=(t5−t4)), during which one or more padding bits are added to make the end time point of the PPDU_22 frame (that is, the time point tp22) be aligned with the end time point of the PPDU_11 frame (that is, the time point tp31).

Figure 18A:
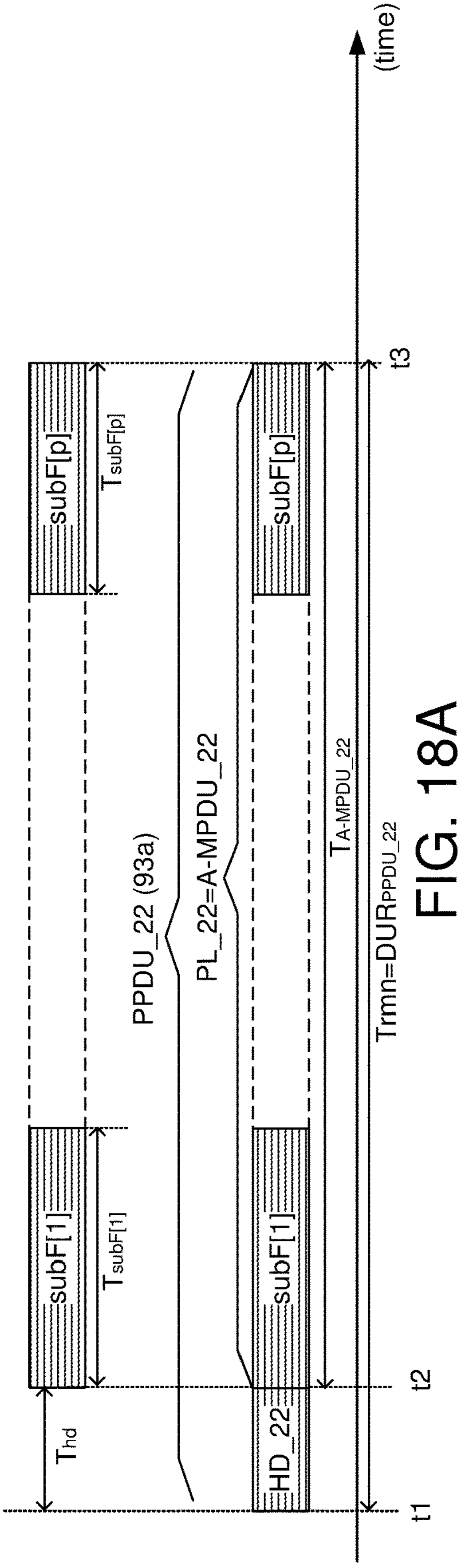
FIGS. 18A and 18B are schematic diagrams illustrating that the number of A-MPDU subframes subF[1]~subF[M] of the payload portion of the PPDU_22 frame is smaller than the number of the data subsets subDAT[n]~subDAT[N] (M<N) when the coherent remnant-duration Trmn is shorter than the duration of the PPDU_22 frame exchange process ($DUR_{PPDU\_22}$).
Figure 18B:
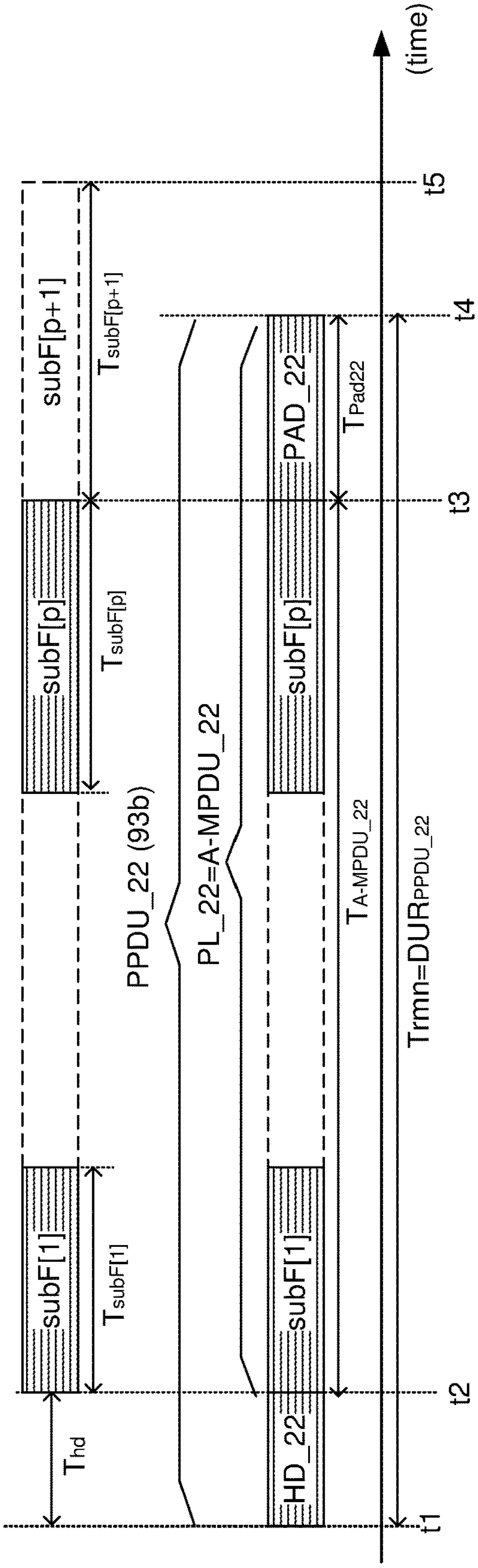

FIGS. 18A and 18B are schematic diagrams illustrating that the A-MPDU subframes subF[1]~subF[N] of the payload portion of the PPDU_22 frame are incapable of carrying all N data subsets subDAT[n]~subDAT[N](M<N) when the coherent remnant-duration Trmn is shorter than the duration of the PPDU_22 frame ($DUR_{PPDU\_22}$). FIGS. 18A and 18B are generally similar, except that padding bits (dummy bits) are excluded in FIG. 18A but included in FIG. 18B.

In FIG. 18A, the coherent remnant-duration Trmn=t3−t1 is equivalent to the summation of the duration of the header portion HD_22 ($T_{hd}$) and durations of p A-MPDU subframes subF[1]~subF[p] ($T_{subF[}$1]~$T_{subF[p]}$), wherein p is a positive number, and 1≤p<N. That is, Trmn=$T_{hd}$+($T_{subF[1}$]+ . . . +$T_{subF[p]}$). Details about constructing the p A-MPDU subframes subF[1]~subF[p] are omitted. In short, the p A-MPDU subframes subF[1]~subF[p] are constructed by selecting p of the N data subsets subDAT[1]~subDAT[N]. Please note that the ordering sequence (1~p) of the A-MPDU subframes subF[1]~subF[p] is not required to be identical to the ordering sequence (1~N) of the data subsets subDAT[1]~subDAT[N].

In FIG. 18B, the coherent remnant-duration Trmn=t4−t1 is longer than the summation of the duration of the header portion HD_22 ($T_{hd}$) and durations of A-MPDU subframes subF[1]~subF[p] ($T_{subF[1}$]~$T_{subF[p]}$) and shorter than the summation of the duration of the header portion HD_22 ($T_{hd}$) and durations of A-MPDU subframes subF[1]~subF[p+1] ($T_{subF[1]}$~$T_{subF[p+1]}$). That is, $T_{hd}$+($T_{subF[1]}$+ . . . +$T_{subF[p]}$)<Trmn<$T_{hd}$+($T_{subF[1]}$+ . . . +$T_{subF[p]}$+$T_{subF[p+1]}$). In other words, the TxMAC(LO) 883 cannot transmit more than p A-MPDU subframes subF[1]~subF[p] within the coherent remnant-duration Trmn. Accordingly, the A-MPDU subframes subF[1]~subF[M] in the payload portion PL_22 carry only M=p of the N data subsets subDAT[1]~subDAT[N].

In FIGS. 18A and 18B, the number of A-MPDU subframes (M) is set to be equivalent to p (set M=p), and p is smaller than N (p<N). This implies that the payload portion of the PPDU_22 frame (PL_22=A-MPDU_22) is incapable of transmitting all the data subsets subDAT[1]~subDAT[N] with the A-MPDU subframes subF[1]~subF[M]. If the payload portion PL_22=A-MPDU_22 further carries any of the remaining data subsets subDAT [M+1]~subDAT[N], the duration of the PPDU_22 frame $DUR_{PPDU\_22}$ will exceed the coherent remnant-duration Trmn, such a situation is not desired in the coherent transmission.

In FIG. 18A, it is assumed that the summation of the duration of header portion $T_{hd}$ and the durations of A-MPDU subframes ($T_{subF[1]}$+ . . . $T_{subF[p]}$) is equivalent to the coherent remnant-duration Trmn. Thus, the PPDU_22 frame includes a header portion HD_22 and a payload portion PL_22 having A-MPDU subframes subF[1]~subF[p].

In FIG. 18B, the PPDU_22 frame includes a header portion HD_22, a payload portion PL_22 having A-MPDU subframes subF[1]~subF[p], and one or more padding bits PAD_22. The padding bits PAD_22 are inserted in an extended padding duration $T_{Pad22}$=(t4−t3) to extend the duration of the PPDU_22 frame ($DUR_{PPDU\_22}$). By doing so, the end time point of the PPDU_22 frame (that is, the second-second time point tp22) is aligned with the end time point of the coherent remnant-duration Trmn (that is, the third-first time point tp31).

In comparison with the payload portion PL_22 frame in FIGS. 16A and 16B, the payload portion PL_22 in FIGS. 18A and 18B include fewer A-MPDU subframes because not all the transmission data txDAT_STA2 are carried. By not transmitting all the transmission data txDAT_STA2, the EMLXR Tx configuration circuit 893 knows that the link-specific MAC(HI) 86 can get a better chance to transmit the remaining data subsets subDAT[p+1]~subDAT[N] on the high performance link L_HI soon after the PPDU_11 frame and PPDU_22 frame end.

FIG. 19 is a schematic diagram illustrating that the link selection module controls the link-specific MAC (LO) to perform the coherent transmission when the coherent remnant-duration Trmn is shorter than the duration of the PPDU_22 frame ($DUR_{PPDU\_22}$).

Please refer to FIGS. 15, 18B, and 19 together. When the duration required by the PPDU_22 frame to transmit all the data subsets subDAT[1]~subDAT[M] is longer than the coherent remnant-duration Trmn ($DUR_{PPDU\_22}$>Trmn), the TxMAC(LO) 883 cannot finish transmitting the whole transmission data txDAT_STA2 with a single PPDU_22 frame before the PPDU_11 frame ends at the third-first time point tp31. That is, the duration of the PPDU_22 frame ($DUR_{PPDU\_22}$) is too long for the coherent remnant-duration Trmn if N is greater than M (N>M). Thus, the EMLXR Tx configuration circuit informs the frame constructor (LO) that only part of the transmission data txDAT_STA2 (subDAT[1]~subDAT[p]) are carried by the A-MPDU subframes subF[1]~subF[M] in the PPDU_22 frame (Step S751 in FIG. 15).

After the backoff procedure of the high performance link BOH ends at the time point t1 (defined as a first-first time point tp11), STA1 transmits the PPDU_11 frame between the time points t1 and t4 (defined as a third-first time point tp31). That is, $DUR_{PPDU\_11}$=(t4−t1). At the time point t2 (defined as a second-first time point tp21), the frame detector (HI) 8653 detects the status of the high performance link L_HI, and the frame parser (HI) 8651 parses the overheard result to acquire the duration information $durINFO_{PL\_11}$. Then, the frame parser (HI) 8651 passes the duration information $durINFO_{PL\_11}$ to the boundary analysis circuit 891. Based on the duration information $durINFO_{PL\_11}$, the boundary analysis circuit 891 can estimate the end time point of the PPDU_11 frame (defined as a third-first time point tp31), for example, the time point t4 in FIG. 19.

On the other hand, from the backoff counter CNT_LO 8813, the boundary analysis circuit 891 knows that the backoff procedure of the low performance link BOL ends at the time point t3 (defined as a first-second time point tp12). Thus, the boundary analysis circuit 891 can calculate the coherent remnant-duration Trmn as the duration between time points t3 and t4. That is, Trmn=t4−t3=tp31−tp12.

Moreover, the boundary analysis circuit 891 receives the transmission data txDAT_STA2 from the wireless control circuit 85. Based on the data length of the transmission data txDAT_STA2, the boundary analysis circuit 891 knows that the transmission data txDAT_STA2 cannot be completely transmitted within the coherent remnant-duration Trmn (between the time points t3 and t4). Thus, the EMLXR Tx configuration circuit 893 should configure the link-specific MAC (LO) 88 to perform the PPDU_22 frame exchange process with EMLXR-based txOnRx alignment (step S753 in FIG. 15).

According to the embodiments of the present disclosure, the EMLXR Tx configuration circuit 893 notifies the link-specific MAC (LO) 88 that the transmission data txDAT_STA2 cannot be fully transmitted by the end of the coherent remnant-duration Trmn, so the link selection module 89 controls the link-specific MAC (LO) 88 to perform the PPDU frame exchange process in which not all of the transmission data txDAT_STA2 are transmitted.

To be more specific, the duration of the PPDU_22 frame ($DUR_{PPDU\_22}$) is specially arranged to be equivalent to the coherent remnant-duration Trmn to ensure that the end time point of the PPDU_22 frame (defined as a second-second time point tp22) aligns with the end time point of the PPDU_11 frame (defined as a third-first time point tp31), for example, the time point t4 in FIG. 19.

Step S753 in FIG. 15 corresponds to the PPDU_22 frame described in FIGS. 18A, 18B, and 19. In FIG. 19, the PPDU_22 frame is constructed based on FIG. 18B. The EMLXR Tx configuration circuit 893 controls the TxMAC (LO) 883 to transmit the PPDU_22 frame during the time points t3 and t4. That is, $DUR_{PPDU\_22}$=(t4−t3)=tp22−tp12. As shown in FIG. 19, t4 is the end time point of both the PPDU_11 frame (t4=tp31) and the PPDU_22 frame (t4=tp22). In other words, the PPDU_11 and PPDU_22 frames end synchronously (tp31=tp22).

Furthermore, the link-specific MAC(HI) 86 may take advantage of the high performance link L_HI to transmit the remaining transmission data (that is, data subsets subDAT[p+1]~subDAT[N]) after the PPDU_11 and PPDU_22 frame exchange processes finish. The remaining transmission data is the difference between the complete transmission data txDAT_STA2 and the transmission data carried by the payload portion PL_22 (that is, data subsets subDAT[1]~subDAT[p]). The transmission procedure of the remaining transmission data requires another execution round of FIG. 4, and the details are omitted.

As illustrated above, FIGS. 17 and 19 show that STA2 performs the PPDU_22 frame exchange process when the coherent remnant-duration Trmn is longer than or equivalent to the minimum PPDU duration $min\_DUR_{PPDU}$. That is, Trmn $min\_DUR_{PPDU}$.

The embodiments shown in FIGS. 17 and 19 represent that STA1 and STA2 respectively perform their corresponding PPDU_11 and PPDU_22 frame exchange processes on the high performance link L_HI and the low performance link L_LO parallelly and simultaneously. Thus, such an approach is called coherent transmission in the present disclosure. The difference between FIGS. 17 and 19 is that the PPDU_22 frame in FIG. 17 carries all the transmission data txDAT_STA2 (data subsets subDAT[1]~subDAT[N]), and the PPDU_22 frame in FIG. 19 carries only part of the transmission data txDAT_STA2 (data subsets subDAT[1]~subDAT[p]).

If $DUR_{PPDU\_22}$≤Trmn (see FIGS. 16A, 16B, and 17), both STA1 and STA2 complete their data transmission by the time point that the coherent remnant-duration Trmn ends. On the other hand, if $DUR_{PPDU\_22}$>Trmn (see FIGS. 18A, 18B, and 19), STA1 and ST2 coherently transmit their transmission data to their corresponding APs (AP1 and AP2, respectively) during the coherent remnant-duration Trmn, and some of the transmission data txDAT_STA2 (that is, data subsets subDAT[p+1]~subDAT[N]) are not transmitted yet.

In some applications, the functions, operations, and connections related to the boundary analysis circuit 891 and EMLXR Tx configuration circuit 893 can be modified, switched, or integrated together. The alternative implementations of the components in the link selection module 89 are not limited.

By way of example, the link selection module performs a transmission control method for transmitting data with the proposed multi-link coherent operation. STA1 transmits the PPDU_11 frame between the first-first time point tp11 and the third-first time point tp31, and the duration information associated with the payload portion PL_11 of the PPDU_11 frame is transmitted at the second-first time point tp21. STA2 tries to acquire the duration information $durINFO_{PL\_11}$ by overhearing the status on the high preperformance link L_HI when it can do so. Besides, STA2 selectively transmits the PPDU_22 frame on the low performance link L_LO between the first-second time point tp12 and the second-second time point tp22.

As demonstrated in the embodiments above, the relative relationships between the time points (tp11, tp21, tp31, tp12, and tp22) may change with the real-time status in the environment, and the transmission control method adaptively selects suitable transmission configurations in response. The transmission configurations, their corresponding suitable situations, and related figures illustrated above are summarized in Table 1.

TABLE 1

| Situation | | | | transmission configuration | figure |
|---|---|---|---|---|---|
| Predefined quality condition is not satisfied | | | | EMLXR | NA |
| Predefined quality condition is satisfied. | L_HI is not busy | | | EMLXR on L_HI | FIG. 7 |
| | Inherent feature of the transmission data txDAT_STA2 meets the exception condition | | | EMLXR on L_LO | FIGS. 11A and 11B |
| | duration information $durINFO_{PL\_11}$ cannot be acquired | | | no transmission | FIGS. 12A and 12B |
| | duration information $durINFO_{PL\_11}$ is available | Trmn < minDURPPDU | | | FIG. 14 |
| | | Trmn ≥ $minDUR_{PPDU}$ | Trmn ≥ $DUR_{PPDU\_22}$ | EMLXR on L_LO, all of the transmission data txDAT_STA2 are transmitted by the PPDU_22 frame | FIG. 17 |
| | | | Trmn < $DUR_{PPDU\_22}$ | EMLXR on L_LO, only part of transmission data txDAT_STA2 are transmitted by the PPDU_22 frame | FIG. 19 |

The Wi-Fi device dynamically switches its transmission configuration for uplink usage, depending on the OBSS traffic. Please note that the transmission configurations, according to the embodiments of the present application, need only adjustment at the local side MLD (for example, STA2 itself). No handshaking with other MLD (for example, AP2) is required. Thus, the MLD can freely and efficiently react to the status changes in the asymmetric links.

When the predefined quality condition is unsatisfied, the MAC module 81 performs the frame exchange process based on the conventional EMLXR. According to the embodiments of the present disclosure, the MAC module 81 freely changes its transmission configuration when the predefined quality condition is satisfied.

As illustrated above, the MAC module 81 may perform the PPDU_22 frame exchange process on the high performance link L_HI (FIG. 7) or on the low performance link L_LO (FIGS. 11A, 11B, and 17), wherein the payload portion PL_22 includes all transmission data txDAT_STA2. Or, the MAC module 81 may temporarily ignore or skip the transmission operation (FIGS. 12A, 12B, and 14). Alternatively, the MAC module 81 may perform the PPDU_22 frame exchange process on the low performance link L_LO, wherein the payload portion PL_22 does not include all transmission data txDAT_STA2 (FIG. 19). According to simulation results, the proposed Wi-Fi device and its associated transmission control method can achieve higher throughput and reduce the latency, regardless changes of environment quality.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A Wi-Fi device, wherein the Wi-Fi device and another Wi-Fi device are in an overlapping basic service set, and the another Wi-Fi device transmits a first physical layer protocol data unit (PPDU) frame on a first link between a first-first time point and a third-first time point, wherein the Wi-Fi device comprises:

a media access control address (MAC) module, comprising:

a receiving circuit, configured for acquiring a duration information associated with a first payload portion of the first PPDU frame at a second-first time point, wherein the second-first time point is between the first-first time point and the third-first time point;

a first transmission circuit corresponding to the first link;

a second transmission circuit, configured for selectively transmitting a second PPDU frame on a second link between a first-second time point and a second-second time point, wherein performance of the second link is lower than performance of the first link; and a link selection module, electrically connected to the receiving circuit, the first transmission circuit, and the second transmission circuit, configured for selectively controlling the first transmission circuit and the second transmission circuit to perform transmission according to statuses of the first link and the second link.

2. A transmission control method employed by a Wi-Fi device, wherein the Wi-Fi device and another Wi-Fi device are in an overlapping basic service set and the another Wi-Fi device transmits a first physical layer protocol data unit (PPDU) frame on a first link between a first-first time point and a third-first time point, wherein the transmission control method comprises steps of:

acquiring a duration information associated with a first payload portion of the first PPDU frame at a second-first time point, wherein the second-first time point is between the first-first time point and the third-first time point; and selectively transmitting a second PPDU frame on a second link between a first-second time point and a second-second time point, wherein performance of the second link is lower than performance of the first link.

3. The transmission control method of claim 2, wherein the Wi-Fi device stops performing transmission on the first link when the another Wi-Fi device transmits the first PPDU frame.

4. The transmission control method of claim 2, wherein the Wi-Fi device stops transmitting the second PPDU frame if the Wi-Fi device is incapable of acquiring the duration information.

5. The transmission control method of claim 4, wherein the Wi-Fi device is incapable of acquiring the duration information if the second-first time point is later than the first-second time point.

6. The transmission control method of claim 4, wherein the Wi-Fi device is incapable of acquiring the duration information if the first-second time point is within a duration of distributed inter-frame spacings on the first link.

7. The transmission control method of claim 2, wherein the Wi-Fi device refers the duration information to obtain the third-first time point, wherein a coherent remnant-duration is defined as a difference between the third-first time point and the first-second time point.

8. The transmission control method of claim 7, wherein the Wi-Fi device stops transmitting the second PPDU frame if the coherent remnant-duration is shorter than a minimum PPDU duration, and the Wi-Fi device transmits the second PPDU frame on the second link within the coherent remnant-duration if the coherent remnant-duration is longer than or equivalent to the minimum PPDU duration.

9. The transmission control method of claim 8, wherein the second PPDU frame comprises a second head portion and a second payload portion, wherein a duration of the second head portion starts at the first-second time point, and a duration of the second payload portion ends at the second-second time point.

10. The transmission control method of claim 9, wherein the second payload portion carries at least part of a transmission data for an access point device.

11. The transmission control method of claim 10, wherein the second payload portion comprises M subframes, the transmission data comprises N data subsets, and each of the M subframes comprises a subframe header and a subframe payload carrying one of the N data subsets, wherein M and N are positive integers, and M is smaller than or equivalent to N.

12. The transmission control method claim 11, wherein the second payload portion is an aggregated MAC protocol data unit (A-MPDU), and the M subframes are A-MPDU subframes.

13. The transmission control method of claim 12, wherein the minimum PPDU duration represents a duration of a physical layer protocol data unit that contains only a first A-MPDU subframe that is qualified for being transmitted.

14. The transmission control method of claim 11, wherein M is smaller than N, and the second payload portion transmits M of the N data subsets with the M subframes if the coherent remnant-duration is shorter than a summation of a duration of the second header portion and a duration required for transmitting all of the N data subsets.

15. The transmission control method of claim 14, wherein the second payload portion further comprises at least one padding bit if a summation of the duration of the second header portion and durations of the M subframes is shorter than the coherent remnant-duration.

16. The transmission control method of claim 11, wherein M is equivalent to N, and the second payload portion transmits all the N data subsets with the M subframes if the coherent remnant-duration is longer than or equivalent to a summation of a duration of the second header portion and a duration required for transmitting all of the N data subsets.

17. The transmission control method of claim 16, wherein the second payload portion further comprises at least one padding bit if a summation of the duration of the second header portion and durations of the M subframes is shorter than the coherent remnant-duration.

18. The transmission control method of claim 2, wherein the first PPDU frame comprises a first header portion and the first payload portion, and the transmission control method further comprises steps of:

detecting the first header portion on the first link; and parsing the duration information from the first header portion.

* * * * *